United States Patent
Wang

(10) Patent No.: US 11,143,946 B2
(45) Date of Patent: Oct. 12, 2021

(54) CUSTOMIZED REFLECTION PROFILES FOR RETRO-REFLECTIVE DISPLAY SYSTEM OPTIMIZATION

(71) Applicant: MirraViz, Inc., Fremont, CA (US)

(72) Inventor: Michael Wang, Sunnyvale, CA (US)

(73) Assignee: MirraViz, Inc., Milpitas, CA (US)

( * ) Notice: Subject to any disclaimer, the term of this patent is extended or adjusted under 35 U.S.C. 154(b) by 0 days.

(21) Appl. No.: 16/829,924

(22) Filed: Mar. 25, 2020

(65) Prior Publication Data
US 2020/0292931 A1    Sep. 17, 2020

Related U.S. Application Data

(63) Continuation of application No. 16/127,011, filed on Sep. 10, 2018, now Pat. No. 10,606,162, which is a
(Continued)

(51) Int. Cl.
*G03B 21/60* (2014.01)
*G03B 21/28* (2006.01)
(Continued)

(52) U.S. Cl.
CPC .......... *G03B 21/60* (2013.01); *G03B 21/28* (2013.01); *G03B 21/56* (2013.01); *G03B 21/602* (2013.01); *G03B 21/604* (2013.01); *G03B 21/625* (2013.01)

(58) Field of Classification Search
CPC ...... G03B 21/60; G03B 21/602; G03B 21/56; G03B 21/625; G03B 21/604
(Continued)

(56) References Cited

U.S. PATENT DOCUMENTS 3,817,596 A * 6/1974 Tanaka ............... G02B 5/124
                                                                 359/532
3,833,285 A * 9/1974 Heenan ............. G02B 5/124
                                                                 359/551
(Continued)

FOREIGN PATENT DOCUMENTS

EP       2160905         7/2014
WO    WO 2015/187433    12/2015
(Continued)

OTHER PUBLICATIONS

Dominic C. O'Brien, Grahame E. Faulkner, and David J. Edwards, "Optical properties of a retroreflecting sheet," Appl. Opt. 38, 4137-4144 (1999) (Year: 1999).*
(Continued)

*Primary Examiner* — Clayton E. LaBalle
*Assistant Examiner* — Kevin C Butler
(74) *Attorney, Agent, or Firm* — Knobbe, Martens, Olson & Bear, LLP

(57) ABSTRACT

The present disclosure provides a display system that may comprise a retro-reflective screen having retro-reflective screen elements that reflect incident light and comprising at least one projector that (i) generates light characterizing an image or video and (ii) projects the light on the retro-reflective screen, wherein the projected light has a nominal profile. Additionally, the retro-reflective screen may reflect the light characterizing the image or video to a viewer in a manner such that an intensity profile of the light is offset away from the projector and has a uniform brightness profile within a field of view of the viewer with respect to the retro-reflective screen. The projected light may have an intensity drop-off that has at least a 200% or 2×, or at least a 500% or 5× intensity reduction per 0.5 degrees outside of the nominal region.

21 Claims, 22 Drawing Sheets

Related U.S. Application Data continuation of application No. PCT/US2017/021889, filed on Mar. 10, 2017.

(60) Provisional application No. 62/307,385, filed on Mar. 11, 2016.

(51) Int. Cl.
 *G03B 21/56* (2006.01)
 *G03B 21/602* (2014.01)
 *G03B 21/604* (2014.01)
 *G03B 21/625* (2014.01)

(58) Field of Classification Search
 USPC .......................................................... 359/459
 See application file for complete search history.

(56) References Cited

U.S. PATENT DOCUMENTS

| | | | |
|---|---|---|---|
| 4,076,383 A * | 2/1978 | Heasley | G02B 5/124 359/531 |
| 4,202,600 A * | 5/1980 | Burke | G02B 5/124 359/514 |
| 4,349,598 A * | 9/1982 | White | G02B 5/124 359/530 |
| 4,588,258 A * | 5/1986 | Hoopman | G02B 5/124 359/530 |
| 4,775,219 A * | 10/1988 | Appeldorn | G02B 5/124 359/532 |
| 4,895,428 A * | 1/1990 | Nelson | G02B 5/124 359/530 |
| 4,938,563 A * | 7/1990 | Nelson | G02B 5/124 359/530 |
| 5,122,902 A * | 6/1992 | Benson | G02B 5/124 359/529 |
| 5,301,005 A * | 4/1994 | deVos | G01C 15/002 356/141.1 |
| 5,585,164 A * | 12/1996 | Smith | G02B 5/122 359/530 |
| 5,691,846 A * | 11/1997 | Benson, Jr. | B29C 39/148 156/245 |
| 5,696,627 A * | 12/1997 | Benson | G02B 5/124 359/529 |
| 5,706,132 A * | 1/1998 | Nestegard | G02B 5/124 359/529 |
| 5,721,640 A * | 2/1998 | Smith | G02B 5/124 359/530 |
| 5,734,501 A * | 3/1998 | Smith | G02B 5/124 359/529 |
| 5,763,049 A * | 6/1998 | Frey | G02B 5/124 428/172 |
| 5,764,413 A * | 6/1998 | Smith | G02B 5/124 359/530 |
| 5,770,124 A * | 6/1998 | Marecki | G02B 5/124 264/1.36 |
| 5,840,405 A * | 11/1998 | Shusta | G02B 5/124 428/156 |
| 5,840,406 A * | 11/1998 | Nilsen | G02B 5/124 428/156 |
| 5,889,615 A * | 3/1999 | Dreyer | G02B 5/124 359/529 |
| 5,898,523 A * | 4/1999 | Smith | G02B 5/124 359/530 |
| 5,981,032 A * | 11/1999 | Smith | B29D 11/00625 428/167 |
| 6,036,322 A * | 3/2000 | Nilsen | G02B 5/124 359/529 |
| 6,045,230 A * | 4/2000 | Dreyer | G02B 5/124 359/529 |
| 6,282,026 B1 * | 8/2001 | Dreyer | G02B 5/124 359/529 |
| 6,302,992 B1 * | 10/2001 | Smith | B29D 11/00625 156/268 |
| 6,325,515 B1 * | 12/2001 | Coderre | G02B 5/124 264/1.9 |
| 6,390,629 B1 * | 5/2002 | Mimura | G02B 5/124 359/529 |
| 6,890,634 B1 * | 5/2005 | Yoon | G02B 5/124 359/515 |
| 6,967,053 B1 * | 11/2005 | Mullen | A42B 3/061 359/529 |
| 7,018,573 B2 * | 3/2006 | Wulff | B29D 11/00605 264/1.9 |
| 7,261,424 B2 * | 8/2007 | Smith | B29D 11/00605 359/529 |
| 7,370,981 B2 | 5/2008 | Couzin | |
| 7,506,987 B2 * | 3/2009 | Nilsen | G02B 5/124 359/529 |
| 9,176,367 B2 * | 11/2015 | Kaneda | H04N 13/232 |
| 10,606,162 B2 * | 3/2020 | Wang | G03B 21/625 |
| 2002/0141060 A1 * | 10/2002 | Lu | G02B 5/124 359/530 |
| 2003/0075815 A1 * | 4/2003 | Couzin | G02B 5/124 264/1.34 |
| 2004/0012849 A1 * | 1/2004 | Cruz-Uribe | G09G 3/001 359/449 |
| 2004/0196555 A1 * | 10/2004 | Mimura | G02B 5/124 359/530 |
| 2005/0141092 A1 * | 6/2005 | Couzin | G02B 5/122 359/529 |
| 2006/0181493 A1 * | 8/2006 | Satoh | G02B 5/124 345/84 |
| 2007/0103781 A1 * | 5/2007 | Couzin | G02B 5/124 359/530 |
| 2007/0109641 A1 * | 5/2007 | Mimura | B29D 11/00605 359/530 |
| 2008/0068713 A1 * | 3/2008 | Smith | B29D 11/00605 359/530 |
| 2009/0295755 A1 * | 12/2009 | Chapman | G02B 5/124 345/175 |
| 2010/0195201 A1 * | 8/2010 | Minoura | G02B 5/128 359/452 |
| 2010/0259604 A1 * | 10/2010 | Surman | H04N 13/32 348/54 |
| 2010/0265585 A1 * | 10/2010 | Kim | G02B 5/124 359/530 |
| 2011/0043915 A1 * | 2/2011 | Mimura | G02B 5/124 359/530 |
| 2011/0292326 A1 * | 12/2011 | Satoh | G02B 5/124 349/113 |
| 2012/0081787 A1 * | 4/2012 | Mimura | G02B 5/124 359/530 |
| 2013/0135731 A1 * | 5/2013 | Smith | B32B 3/263 359/529 |
| 2013/0335641 A1 * | 12/2013 | Aoki | G03B 21/60 348/744 |
| 2013/0342813 A1 * | 12/2013 | Wang | G02B 30/35 353/7 |
| 2016/0205392 A1 * | 7/2016 | Wang | H04N 13/139 348/54 |
| 2017/0160631 A1 * | 6/2017 | Wang | G03B 21/606 |
| 2018/0292741 A1 | 10/2018 | Wang | |

FOREIGN PATENT DOCUMENTS

| | | | | |
|---|---|---|---|---|
| WO | WO-2015187433 A1 * | 12/2015 | | G03B 35/20 |
| WO | WO 2017/156448 | 9/2017 | | |

OTHER PUBLICATIONS

P. R. Yoder, "Study of Light Deviation Errors in Triple Mirrors and Tetrahedral Prisms," J. Opt. Soc. Am. 48, 496-499 (1958) (Year: 1958).*

Young Min Kim, Byoungsub Song,2 and Sung-Wook Min, "Projection-type integral imaging system using a three-dimensional screen composed of a lens array and a retroreflector film", Applied Optics No. 13, May 1, 2017, 7 pages (Year: 2017).*

(56) References Cited

OTHER PUBLICATIONS

Mark H. Bergen, Jacqueline Nichols, Christopher M. Collier, Xian Jin, Balakrishnan Raja, Deborah J. Roberts, Paul Ruchhoeft, Richard C. Willson, and Jonathan F. Holzman, "Retroreflective imaging system for optical labeling and detection of microorganisms," Appl. Opt. 53, 3647-3655 (2014) (Year: 2014).*
Office Action dated Jun. 24, 2020 in Chinese Application No. 201780029223.2.
U.S. Appl. No. 16/670,950, filed Oct. 31, 2019, Wang.
International Preliminary Report on Patentability in PCT Application PCT/US2017/021889 dated Sep. 20, 2018.
International Search Report and Written Opinion in PCT Application No. PCT/US2017/021889 dated Aug. 7, 2017.
Office Action dated Apr. 9, 2021 in Chinese Application No. 201780029223.2.

* cited by examiner

CUSTOMIZED REFLECTION PROFILES FOR RETRO-REFLECTIVE DISPLAY SYSTEM OPTIMIZATION

CROSS-REFERENCE TO RELATED APPLICATIONS

This application is a continuation of U.S. application Ser. No. 16/127,011 filed Sep. 10, 2018, now U.S. Pat. No. 10,606,162, which is a continuation of International Patent Application No. PCT/US2017/021889, filed Mar. 10, 2017, which claims the benefit of priority to U.S. Provisional Application No. 62/307,385 filed Mar. 11, 2016, the contents of all of which are incorporated herein by reference in their entireties.

BACKGROUND

Current state-of-the-art display systems generally consist of either flat-panel displays or projector-based displays. The flat-panel displays are generally based on liquid crystal display (LCD) pixels with light emitting diode (LED) backlighting or plasma-based screens. In some cases, it is difficult to attain screen sizes significantly larger than 80 inches in the diagonal dimension due to various considerations. For flat-panel displays, nonlinear increases in cost as the screen size grows, as well as high power consumption, may limit screen sizes to below 80 inches at typical consumer price points. For projection-based displays, decreasing screen brightness and increasing power consumption, projector size and projector noise, may be significant limitations if the screen size is increased above 80 inches. Additionally, for both types of displays there is currently no optimal solution for glasses-free three-dimensional (3D) immersive viewing. Current 3D display systems rely on either active or passive glasses, or require the viewer to be located in a substantially constrained region of space in line-of-sight of the display.

SUMMARY

The present disclosure provides display systems and methods that address various limitations of other displays systems and current available. A display system of the present disclosure can include a projector and a retro-reflective screen, which can provide various non-limiting benefits over other systems currently available. For example, systems of the present disclosure may provide an immersive multiplayer gaming experience that does not currently exist with display systems currently available. As another example, systems of the present disclosure provide customized large area displays for advertising or other applications where it may be beneficial for multiple users to observe unique streams of media, in some cases at the same time. As another example, a display system of the present disclosure can permit multiple viewers to view individual customized image or video streams on the same screen, in some cases simultaneously, as well as a glasses-free 3D immersive viewing capability.

The present disclosure provides display systems utilizing a projector and a retro-reflective screen. Such display systems comprise a projector combined with a retro-reflective screen and a viewer distance from the projector such that an observation angle is substantially small, in some cases less than approximately 10 degrees, 5 degrees, 4 degrees, 3 degrees, 2 degrees, or 1 degree. In cases where an incident angle is large, there can be degradation of retro-reflected image intensity resulting in reduced image brightness and reduced image uniformity.

This situation can often occur near the edges of a retro-reflective screen.

The present disclosure provides systems and methods to enable significant improvements in display systems utilizing a projector and a retro-reflective screen through optimization of the retro-reflective screen elements in order to customize the retro-reflected spatial profile. The nature of retro-reflective display system can enable significantly improved image brightness in comparison to a standard projector/reflective screen system. However, depending on the specific viewer-to-projector and viewer-to-screen distances for a given application, further optimization of the angular distribution of retro-reflected light can significantly improve both the intensity of light reaching a viewer's eyes as well as improvement in the ability to optimize a ratio of light intensity reaching each eye for glasses-free 3D applications.

An aspect of the present disclosure provides a method for engineering and customizing the retro-reflective screen elements of the retro-reflective screen such that multiple return angles are achieved and combined in order to provide for specific display applications, in some cases by meeting desired properties for each specific display application. Examples from PCT Patent Application PCT/US2015/032757 filed May 27, 2015, which is entirely incorporated herein by reference, include: 1) a vertically offset and vertically spread retro-reflected light distribution for 3D immersive head mounted applications, wherein the intensity, cross-talk and range of viewing distances are improved, 2) a vertically offset and horizontally spread-reflected light distribution for large area retroreflective display applications to enable intensity increase and an increased viewing angle, and 3) a spread of retro-reflected light distribution to optimize intensity increase for a single projector head-mounted system. In these examples, image properties such as brightness and 3D cross-talk for projected images can be significantly improved over the baseline performance of a retro-reflective display system. In the present disclosure, additional aspects will include customized retro-reflective profiles optimized for different applications. One additional aspect is a ring shaped profiles for applications with a large range of incidence angles. Another additional aspect is a vertically offset retro-reflective profile with a uniform intensity distribution within a certain area and sharp intensity drop-off outside of that region. This may be used for applications such as large area fixed projection to keep uniform brightness for single user and enhance privacy. Yet another additional aspect is a sideways stretched profile with sharp intensity drop-off outside of the uniform region that may be used for side mounted head-mounted devices. Another additional aspect is a "+" or "x" shaped profile that may be used for constrained table top applications. Another additional aspect is an "x" shaped pattern for applications where-in a head-mounted projector is mounted above and to side of the eye or below and to the side of the eye. Another additional aspect is a retro-reflective profile with a large vertical offset. This may be used for desktop or laptop mounted projector or in settings such as airplanes or other transportation environments where the screen in relatively closer proximity to user and where there is a benefit for a non-head mounted projector configuration.

In another aspect of the present disclosure, a display system comprises a retro-reflective screen having retro-reflective screen elements that reflect incident light, and at least one projector that (i) generates light characterizing an image or video and (ii) projects the light onto the retro-reflective screen.

In some embodiments, each of at least two of the three intersecting planes intersects an adjacent plane at an angle that is 90° with an offset greater than 00. In some embodiments, each of the three intersecting plane intersects an adjacent plane at an angle that is 90° with an offset greater than 00°. In some embodiments, the offset is at least about 0.1°. In some embodiments, the offset is at least about 0.3°. In some embodiments, the offset is at least about 0.5°. In some embodiments, the retro-reflected intensity profile comprises a horizontal stretching of the profile.

In some embodiments, each of the retro-reflective screen elements comprises three intersecting planes, and wherein at least one of the three intersecting plane intersects an adjacent plane at an angle that is 90° with an offset greater than 00. In some embodiments, the retro-reflective screen reflects the light at an optical cross-talk that is decreased by at least 10% and/or an intensity that is increased by a factor of at least 1.1, as compared to a retro-reflective screen with retro-reflective screen elements having planes that each intersects an adjacent plane at an angle of 90° without the offset.

In an additional aspect of the invention, a display system comprises a retro-reflective screen having retro-reflective screen elements that reflect incident light, and at least one projector that (i) generates light characterizing an image or video and (ii) projects the light onto the retro-reflective screen, wherein the retro-reflective screen having the retro-reflective screen elements reflects the light characterizing the image or video to a viewer in a manner such that an intensity profile of the light is offset away from the projector and has a uniform brightness profile within a field of view of the viewer with respect to the retro-reflective screen and an intensity drop-off outside of the field of view.

In a further aspect of the invention, a display system comprises a retro-reflective screen having retro-reflective screen elements that reflect incident light, and at least one projector that (i) generates light characterizing an image or video and (ii) projects the light onto the retro-reflective screen, wherein the retro-reflective screen having the retro-reflective screen elements reflects the light characterizing the image or video to a viewer in a manner such that an intensity profile of the light is offset in a vertical direction away from the projector, which offset is greater than 10 degrees.

In some embodiments, the at least three distinct optical regions have different intensity profiles. In some embodiments, the optical profile has a characteristic cross ("x") shaped pattern or plus ("+") shaped pattern. In some embodiments, the optical profile having a characteristic plus ("+") shaped pattern has four distinct viewable regions. In some embodiments, the optical profile has a ring shaped pattern. In some embodiments, the optical profile having a ring shaped pattern has at least four distinct viewable regions. In some embodiments, the optical profile having a ring shaped pattern has at least five distinct viewable regions. In some embodiments, the optical profile having a ring shaped pattern has at least six distinct viewable regions.

In an aspect of the invention, a display system may comprise: a retro-reflective screen having retro-reflective screen elements that reflect incident light, which retro-reflective screen comprises retro-reflective screen elements each comprising three intersecting planes; and at least one projector that (i) generates light characterizing an image or video and (ii) projects the light onto the retro-reflective screen, wherein the retro-reflective screen having the retro-reflective screen elements reflects the light characterizing the image or video to a viewer in a manner such that a focal point of an intensity profile of the light is offset horizontally with respect to the viewer, and wherein the projected light has an intensity drop-off that has at least a 200% intensity reduction per 0.5 degrees outside a region of desired light intensity, the region configured to be within an observation angle of the viewer, wherein the observation angle is less than 10 degrees. In some embodiments, the intensity reduction is at least 500%.

In some embodiments, each of at least two of the three intersecting planes of the display system can intersect an adjacent plane at an angle that is about 90° with an offset greater than 00. In other embodiments, each of the three intersecting plane of the display system can intersect an adjacent plane at an angle that is about 90° with an offset greater than 00°.

In some embodiments, the retro-reflected intensity profile of the display system may comprise a horizontal stretching of the profile.

In some embodiments, each of the retro-reflective screen elements of the display system comprises three intersecting planes, and wherein at least one of the three intersecting plane intersects an adjacent plane at an angle that is about 90° with an offset greater than 00°.

In some embodiments, the retro-reflective screen reflects the light at an optical cross-talk that is decreased by at least about 10% and/or an intensity that is increased by a factor of at least about 1.1, as compared to a retro-reflective screen with retro-reflective screen elements having planes that each intersects an adjacent plane at an angle of about 90° without the offset.

In some embodiments, the observation angle is between 0.1 degrees and 4 degrees. In some embodiments, the observation angle is between 0.5 degrees and 2 degrees.

In an additional aspect of the invention, a display system comprises: a retro-reflective screen having retro-reflective screen elements that reflect incident light, which retro-reflective screen comprise s retro-reflective screen elements each comprising three intersecting planes; and at least one projector that (i) generates light characterizing an image or video and (ii) projects the light onto the retro-reflective screen, wherein the retro-reflective screen having the retro-reflective screen elements reflects the light characterizing the image or video to a viewer in a manner such that a focal point of an intensity profile of the light is offset away from the projector and has a uniform brightness profile within a field of view of the viewer with respect to the retro-reflective screen, and wherein the projected light has an intensity drop-off that has at least a 200% intensity reduction per 0.5 degrees outside of a region of desired light intensity, the region configured to be within an observation angle of the viewer, wherein the observation angle is less than 10 degrees. In some embodiments, the intensity reduction is at least 500%. In some embodiments, the observation angle of the display system is between 0.1 degrees and 4 degrees. In some embodiments, the observation angle of the display system is between 0.5 degrees and 2 degrees.

In some embodiments, at least one of the three intersecting plane of the display system intersects an adjacent plane at an angle that is about 90° with an offset greater than 00. In some embodiments, the retro-reflective screen of the display system reflects the light at an optical cross-talk that is decreased by at least about 10% and/or an intensity that is increased by a factor of at least about 1.1, as compared to a retro-reflective screen with retro-reflective screen elements having planes that each intersects an adjacent plane at an angle of about 90° without the offset.

In some embodiments, each of at least two of the three intersecting planes of the display system intersects an adjacent plane at an angle that is about 90° with an offset greater than 00. In some embodiments, each of the three intersecting plane intersects an adjacent plane at an angle that is about 90° with an offset greater than 00°.

In another aspect of the invention, a display system can comprise: a retro-reflective screen having retro-reflective screen elements that reflect incident light, which retro-reflective screen comprise s retro-reflective screen elements each comprising three intersecting planes; and at least one projector that (i) generates light characterizing an image or video and (ii) projects the light onto the retro-reflective screen, wherein the retro-reflective screen having the retro-reflective screen elements reflects the light characterizing the image or video to a viewer in a manner such that a focal point of an intensity profile of the light is offset in a vertical direction away from the projector, which offset is greater than 1 degree relative to a reference plane.

In a further aspect of the invention, a display system may comprise: a retro-reflective screen having retro-reflective screen elements that reflect incident light, wherein each of the retro-reflective screen elements comprises three intersecting planes, wherein at least one of the three intersecting plane intersects an adjacent plane at an angle that is about 90° with an offset greater than 0°; and at least one projector that (i) generates light characterizing an image or video and (ii) projects the light onto the retro-reflective screen, wherein the retro-reflective screen having the retro-reflective screen elements reflects the light characterizing the image or video to a viewer such that the light is viewable by the viewer in an optical profile having at least four distinct optical regions.

In some embodiments, each of at least two of the three intersecting planes of the display system intersects an adjacent plane at an angle that is about 90° with an offset greater than 00°.

In some embodiments, at least four distinct optical regions have different intensity profiles.

In some embodiments, the optical profile has a characteristic cross ("x") shaped pattern or plus ("+") shaped pattern. In some embodiments the optical profile can have a characteristic plus ("+") shaped pattern has four distinct viewable regions.

In some embodiments, the optical profile has a ring shaped pattern. In some embodiments, the optical profile having a ring shaped pattern has at least four regions of high intensity retro-reflected light. In some embodiments the optical profile having a ring shaped pattern has at least six regions of high intensity retro-reflected light.

In another aspect of the invention, a method for projecting an image or video can comprise: providing a retro-reflective screen having retro-reflective screen elements that reflect incident light, which retro-reflective screen comprises retro-reflective screen elements each comprising three intersecting planes; and using at least one projector to (i) generate light characterizing the image or video, and (ii) project the light onto the retro-reflective screen, wherein the retro-reflective screen having the retro-reflective screen elements reflects the light characterizing the image or video to a viewer in a manner such that a focal point of an intensity profile of the light is offset horizontally with respect to the viewer, and wherein the projected light has an intensity drop-off that has at least a 200% intensity reduction per 0.5 degrees outside of a region of desired light intensity, the region configured to be within an observation angle of the viewer, wherein the observation angle is less than 10 degrees. In some embodiments, the intensity reduction is at least 500%. In some embodiments, the observation angle is between 0.1 degrees and 4 degrees. In some embodiments, the observation angle is between 0.5 degrees and 2 degrees.

In a further aspect of the invention, a method for projecting an image or video can comprise: (a) providing a retro-reflective screen having retro-reflective screen elements that reflect incident light, which retro-reflective screen comprises retro-reflective screen elements each comprising three intersecting planes; and (b) using at least one projector to (i) generate light characterizing the image or video, and (ii) project the light onto the retro-reflective screen, wherein the retro-reflective screen having the retro-reflective screen elements reflects the light characterizing the image or video to a viewer in a manner such that a focal point of an intensity profile of the light is offset away from the projector and has a uniform brightness profile within a field of view of the viewer with respect to the retro-reflective screen, and wherein the projected light has an intensity drop-off that has at least a 200% intensity reduction per 0.5 degrees outside of a region of desired light intensity, the region configured to be within an observation angle of the viewer, wherein the observation angle is less than 10 degrees. In some embodiments, the intensity reduction is at least 500%. In some embodiments, the observation angle is between 0.1 and 4 degrees. In some embodiments, the observation angle is between 0.5 degrees and 2 degrees.

In some embodiments, a method for projecting an image or video can comprise: (a) providing a retro-reflective screen having retro-reflective screen elements that reflect incident light, which retro-reflective screen comprises retro-reflective screen elements each comprising three intersecting planes; and (b) using at least one projector to (i) generate light characterizing the image or video, and (ii) project the light onto the retro-reflective screen, wherein the retro-reflective screen having the retro-reflective screen elements reflects the light characterizing the image or video to a viewer in a manner such that a focal point of an intensity profile of the light is offset in a vertical direction away from the projector, which offset is greater than 1 degree.

In a further aspect of the invention, a method for projecting an image or video can comprise: (a) providing a retro-reflective screen having retro-reflective screen elements that reflect incident light, wherein each of the retro-reflective screen elements comprises three intersecting planes, wherein at least one of the three intersecting plane intersects an adjacent plane at an angle that is 90° with an offset greater than 0°; and (b) using at least one projector to generate light characterizing the image or video, and (ii) project the light onto the retro-reflective screen, wherein the retro-reflective screen having the retro-reflective screen elements reflects the light characterizing the image or video to a viewer such that the light is viewable by the viewer in an optical profile having at least four distinct optical regions.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity. A better understanding of the features and advantages of the present invention will be obtained by reference to the following detailed description that sets forth illustrative embodiments, in which the principles of the invention are utilized, and the accompanying drawings (also "figure" and "FIG." herein), of which.

DETAILED DESCRIPTION

Figure 1:
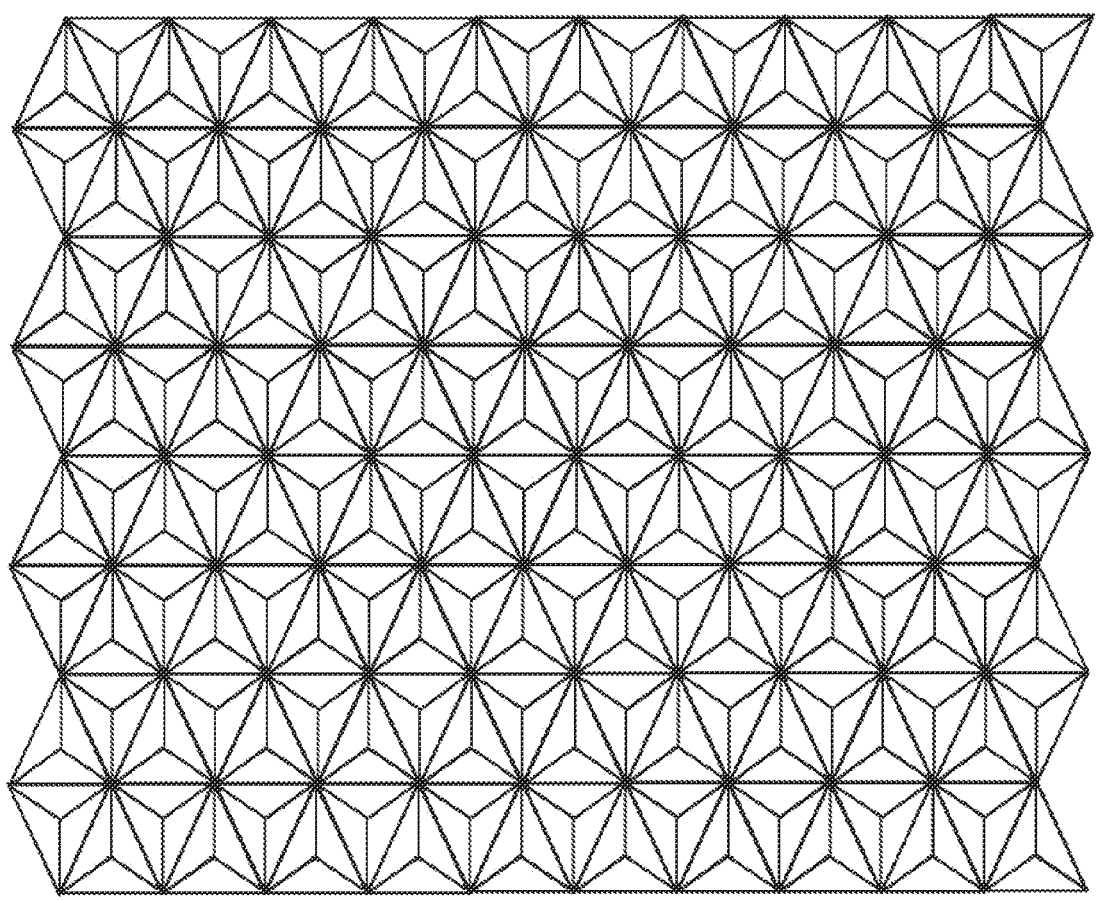
FIG. 1 schematically shows a magnified front view of a representative retro-reflective screen.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The term "retroreflective" (also "retro-reflective" or "retro reflective" herein), as used herein, generally refers to a device or surface that reflects light back to its source with a minimum scattering of light. In a retroreflective screen, an electromagnetic wave is reflected back along a vector that is parallel to but opposite in direction from the source of the wave. A retroreflective screen comprises a retroreflective surface comprised of many small individual corner cube reflective elements.

The term "corner cube reflective element," as used herein, generally refers to a reflective partial cube composed of three mutually perpendicular, nearly perpendicular, or angled flat reflective surfaces. With this geometry, incident light is reflected back directly towards the source.

The term "projector," as used herein, generally refers to a system or device that is configured to project (or direct) light. The projected light can project an image and/or video.

The term "observation angle," as used herein, generally refers to an angle between a first line directed from a projector to a given location on a screen and a second line from that same location on the screen to one or more eyes of a viewer.

The term "return angle," as used herein, generally refers to the angle between an incident beam of light and the reflected beam of light from a screen. For a typical surface, the return angle has a broad range of values. For a retroreflective screen that has not been formed as described herein, the return angle typically has a very small spread of angles centered around zero.

The term "incidence angle," or sometimes referred to as "entrance angle" as used herein, generally refers to an angle between a first line directed from a projector to a given location on a screen and a second line that is normal to the nominal front surface of the corner cube. The nominal front surface of the corner cube is defined as the surface perpendicular to and intersecting the mid-point of a line from the corner of the corner cube structure to the hypothetical opposite corner of the cube if the corner cube were to have been a full cube.

The term "optical cross-talk" (also "cross-talk" herein), as used herein, generally refers to retro-reflected light from a projector that reaches a viewer (or eye of a viewer) that was not intended to receive the light. This can result in a poor 3D viewing experience exhibited by "ghosting" which is a term used herein to describe double images seen by viewers where only one image is intended. The term "perceived cross-talk" as used herein, generally refers to the ratio of the intensity of undesired retro-reflected light that reaches a viewer (or eye of a viewer) relative to the intensity of desired retro-reflected light. For example, if the left eye is intended to receive a bright image from a projector in close proximity to the left eye, but also receives an image from a right-eye mounted projector, then the ratio of the intensity from the right projector divided by the intensity from the left projector may be the perceived cross-talk observed by the left eye. There may be scenarios where absolute intensity of undesirable light from the opposite projector has decreased, but the intensity of desired light from the near projector has decreased by an even larger amount, resulting in worsening in perceived cross-talk.

The present disclosure provides a display system that permits multiple viewers to view individual customized video streams simultaneously on the same screen as well as a glasses free 3D immersive viewing capability. The display system can comprise a projector combined with a retro reflective screen and a viewer distance from the projector. In some cases, this can enable the observation angle (e.g., the line from the projector to a given location on the screen and the line from that same location on the screen to the eye or eyes of the viewer) to be less than approximately 1-3 degrees. In an example, at 1 degree, the intensity can be 3× lower as compared to the intensity at 0.5 degrees, and at 2 degrees the intensity drops by another factor of 3× as compared to the intensity at 1 degree—thus, the intensity at 2 degrees can be a factor 9× lower as compared to the intensity at 0.5 degrees. In other cases, this can enable the observation angle to be less than approximately 0.5-4 degrees. The brightness of the image on the screen of the display system can be increased by a factor of about 100 to 500 as compared to traditional display systems with an equivalent power or intensity of light source.

Some retro-reflective screens used in retro-reflective display systems have an angular distribution centered on the light source. However, depending on the application, this may not be the ideal return angle for the retro-reflected light. Retro-reflective screens provided herein can provide an angular distribution that is not centered on the light source.

Optimization of Reflector Display Systems

The present disclosure provides a display system with a retro reflective screen having retro reflective screen elements that are engineered and customized such that brightness can be significantly improved above and beyond the already significant intensity increase enabled by baseline retro-reflective display systems. The display system can provide for a significant decrease in the perceived (or effective) cross-talk between light sources for multi-source retro-reflective display systems. The display system can be used with any retro-reflective display application where the observation angle is non-zero. The retro-reflective screen, which can be configured to reflect incident light along a direction that is substantially opposite to the direction of propagation of the incident, can enable significantly improved brightness. The incident light can be reflected along a direction that is generally opposite from the direction of propagation, such as non-parallel or antiparallel. For example, the incident light is reflected along a direction that is from about 170°-190° with respect to the direction of propagation.

The display system can comprise a retro-reflective screen configured to reflect incident light along a direction that is substantially non-parallel (e.g., anti-parallel) to the direction of propagation of the incident light, and a projector for projecting light characterizing an image or video onto the retro-reflective screen without the passage of light through a beam splitter. The retro-reflective screen may reflect incident light from the projector to a viewer without the passage of light through either a beam splitter or any diffuser layers. The retro-reflective screen can reflect incident light from the projector to a viewer at an observation angle that is less than or equal to about 20°, 15°, 10°, 9°, 8°, 7°, 6°, 5°, 4°, 3°, 2°, 1.5°, 1°, 0.5°, 0.4°, 0.3°, 0.2°, or 0.1°. The observation angle can be between about 0.1° and 10°, or 0.2° and 3° display system can operate without the need of a beam splitter, thereby advantageously providing for reduced complexity and/or cost as well as avoiding at least a 2×, 3×, 4× or greater reduction in intensity compared to a system using a beam splitter.

The retro-reflective screen can minimize cross-talk. Cross-talk can be at most about 20%, 15%, 10%, 5%, 4%, 3%, 2%, 1%, or 0.5%. In some cases, cross-talk is from about 0.1% to 20%, or 0.5% to 10%.

The observation angle can be a function of the distance of the user from the retro-reflective screen. In some embodiments, the observation angle is less than about 5°, 4°, 3°, 2°, 1.5°, 1°, 0.5°, 0.4°, 0.3°, 0.2°, or 0.1° when the user is at a distance of at least about 1 foot, 2 feet, 3 feet, 4 feet, 5 feet, 6 feet, 7 feet, 8 feet, 9 feet, or 10 feet from the retro-reflective screen. In an example, the observation angle can be less than about 3° when the user is at a distance of at least about 4 feet from the retro-reflective screen. In some cases, the intensity of reflected light from the retro-reflected screen is a maximum at observation angle of about 0°, and decreases with increasing observation angle.

In an aspect, a display system comprises a retro-reflective screen having retro-reflective screen elements that reflect light along a direction that is substantially non-parallel to the direction of propagation of the light. Each of the retro-reflective screen elements comprises at least three intersecting planes (e.g., in the form of a pyramidal structure or truncated pyramidal structure). At least one of the three intersecting planes can intersect an adjacent plane (e.g., of the same retro-reflective screen element) at an angle that is 90° with an offset greater than 0°. The system further comprises at least one projector that projects the light onto the retro-reflective, which light characterizes an image or video. The retro-reflective screen having the retro-reflective screen elements reflects the light with optical cross-talk that is decreased by at least 10% and/or an intensity that is increased by at least 5%, as compared to a retro-reflective screen with retro-reflective screen elements having planes that each intersects an adjacent plane at an angle of 90° without the offset. The retro-reflective screen can include truncated corner cube reflectors.

In some cases, the system comprises multiple projectors. For example, the system can include two projectors that provide a stereoscopic image or video for 3D viewing.

The system can provide for minimized cross-talk and improved intensity relative to other systems. In situations in which one projector is used, there may be no cross-talk, but the system can provide improved intensity. This can allow a more customizable location for a viewer relative to the projector. In situations in which two or more projectors are used, the system may provide for a reduction in cross-talk and improvement in intensity.

The cross-talk can be determined using a plot of intensity of light reflected from the retro-reflective screen as a function of viewing angle. This can be used to compare the intensity of light received by the intended eye/viewer from the intended source and comparing to the intensity of light received by the same eye/viewer from another source that is not intended to be viewed by that eye/viewer. A decrease in cross-talk can be assessed by generating such plots for various retro-reflective screen and projector configurations, and comparing an overlap of intensity distributions. Cross-talk may be viewed as the ratio of image/video intensity from an undesired/unintended source versus the image/video intensity coming from the desired/intended source.

The image or video can be three-dimensional. For example, the image or video is rendered by more than one projector such that, upon reflection by the retro-reflective screen, the image or video is three-dimensional. In some case s, the image or video is three-dimensional without the use of any optics, such as 3D glasses.

Each of at least one, two or all three of the three intersecting planes can intersect a plane of an adjacent retro-reflective screen element at an angle that is 90° with an offset greater than 00. The offset can be at least about 0.01°, 0.05°, 0.10, 0.15°, 0.2°, 0.3°, 0.4°, 0.5°, 1°, 2°, 3°, 4°, 5° or 10°. In some cases, the offset is between about 0.01° and 5°, or 0.1° and 1°. In some examples, the offset is from about 0.1° to 1.5°; below 0.1 may not yield much change in profile, whereas above 1.5° may yield a loss intensity. The offset can be as described elsewhere herein.

The projector can project the light onto the retro-reflective screen without passage through a beam splitter. The retro-reflective screen can reflect the light from the projector to a viewer without the passage of light through a beam splitter. Thus, a beam splitter can be precluded from the display system.

The projector can be mountable on a body of a viewer. In some examples, the projector is mountable on a head of the viewer. The projector can be mountable with a support member, such as body or head support member (e.g., support strap(s)). The projector can also be mounted at a fixed location, independent of the viewer such that a viewer may enter the range of the projector.

The display system can include a sound system for providing sound to complement the image or video. The sound can go along with a viewer's viewing experience, such as by way of headphones or other local speaker system.

The retro-reflective can have various sizes and configurations. The screen can be substantially flat or curved. The screen can have a width of at least about 1 meter (m), 10 m, or 50 m, and a height of at least about 1 m, 10 m or 50 m. In large area settings, a large area display can be effective for advertising purposes, or other showcase demonstrations, due, at least in part, to the qualities of the display size and having multiple images/videos on the same screen area.

The optical cross-talk can be decreased by at least 1%, 2%, 3%, 4%, 5%, 10%, 20%, 30%, 40%, 50%, or even nearly 100% as compared to a retro-reflective screen with retro-reflective screen elements having planes that each intersects a plane of an adjacent retro-reflective screen element at an angle of 90° without the offset. The retro-reflective screen elements can reflect the light at an optical cross-talk that is less than 50%, 40%, 30%, 20%, 10%, 5%, 1%, or 0.1%. The intensity of the image/video for the intended eye/viewer can be increased by a factor of at least 1.1×, 1.2×, 1.3×, 1.4×, 1.5×, 2×, 2.5×, 3×, 4×, 5×, 6×, 7×, 8×, 9×, 10×, or 20× as compared to a retro-reflective screen with retro-reflective screen elements having planes that each intersects a plane of an adjacent retro-reflective screen element at an angle of 90° without the offset. In some examples, the retro-reflective screen element reflects the light such that optical cross-talk between two sources and corresponding viewer eyes is decreased by at least 1%, 2%, 3%, 4%, 5%, 10%, 20%, 30%, 40%, 50%, or nearly 100%, and an effective intensity that is increased by a factor of at least 1.1×, 1.2×, 1.3×, 1.4×, 1.5×, 2×, 2.5×, 3×, 4×, 5×, 6×, 7×, 8×, 9×, 10×, or 20×.

In some examples, a first plane of the three intersecting plane intersects an adjacent plane of the retro-reflective screen element at an angle that is 90° with a first offset greater than 00 in either direction from the nominal 90% angle, and a second plane of the three intersecting plane intersects a plane of an adjacent retro-reflective screen element at an angle that is 90° with a second offset greater than 00. The first offset can be different from the second offset. Alternatively, the first offset can be the same as the second offset. In some cases, a third plane of the three intersecting plane intersects a plane of an adjacent retro-reflective screen element at an angle that is 90° with a third offset greater than 00. The third offset can be different from the first offset, second offset, or first and second offsets. Alternatively, the third offset can be the same as the first offset, second offset, or first and second offsets.

FIG. 1 shows a front view of a representative retro-reflective screen. The retro-reflective screen is comprised of an array of truncated corner cube reflectors. The corner cube reflectors may also be comprised of alternative geometries. Examples of corner cube reflectors are provided in U.S. Pat. No. 5,763,049 to Frey et al. and U.S. Pat. No. 7,261,424 to Smith, which patents are entirely incorporated herein by reference. In some embodiments, the size of each of the corner cube reflectors is smaller than the anticipated or predicted pixel size of the projected image, with the pixel size determined by the combination of the projector display system and the distance of the projector from the retroreflective screen.

Figure 22:
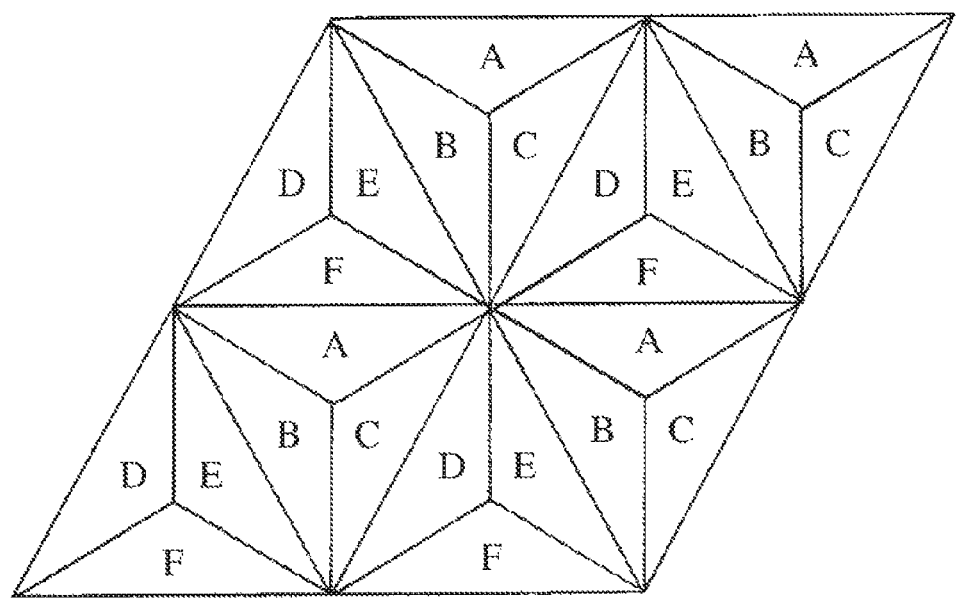
FIG. 22 schematically illustrates a retro-reflective screen with retro-reflective screen elements having intersecting planes.

A retro-reflective screen can include retro-reflective screen elements having intersecting planes. This is schematically illustrated in FIG. 22, which shows pyramidal retro-reflective screen elements with intersecting planes A-F. Planes of adjacent elements may intersect one another at an angle that is 90°. For example, Planes B and C at the bottom left-hand portion of the schematic intersect at an angle of 90°. In some cases, at least one of three intersecting planes can intersect an adjacent plane (e.g., of the same retro-reflective screen element) at an angle that is 90° with an offset greater than 0°. For example, the D plane at the bottom left-hand portion of FIG. 22 can intersect the E plane at an angle that is 90° with an offset greater than 0°.

Figure 2:
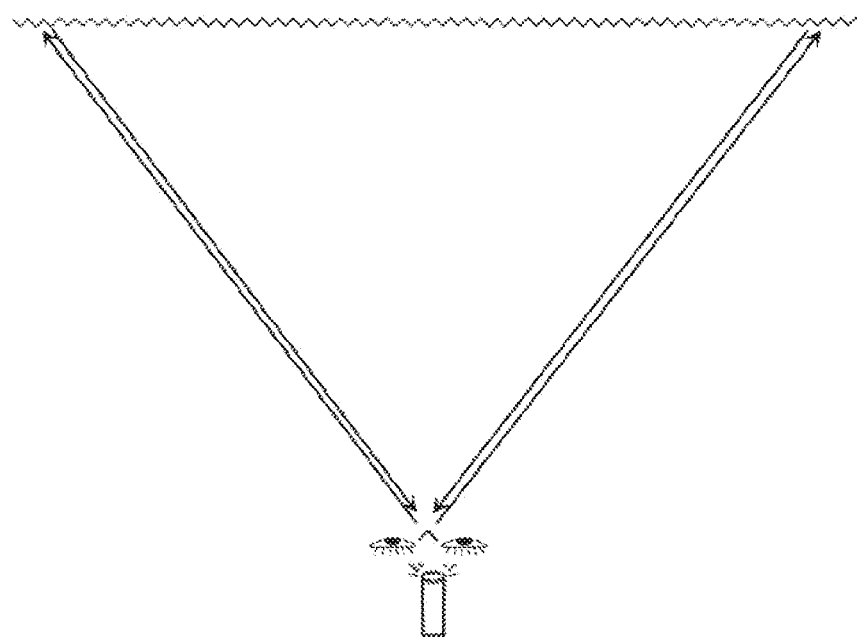
FIG. 2 schematically shows a top view of a representative retro-reflective screen and projector system with the viewer facing the screen.

FIG. 2 shows a schematic top view of a system having a projector and a retro-reflective screen. The retro-reflective properties of the screen cause a majority of the light incident upon the screen to be reflected back towards the projector in a tight directional cone of light regardless of the incident angle. This is in contrast to some conventional screens which scatter incident light in a relatively isotropic manner. In such a conventional screen set up only a very small fraction of the light incident on the screen actually impinges upon the viewer's eyes. Because of the retroreflective effect with this type of system, if the viewer's eye(s) is in close proximity to the projector such that the angle defined by the path from the projector to the reflective screen and returning to the viewer's eye is small, then the brightness of the image may be increased significantly over a conventional projector and reflective screen set up. The system of FIG. 2 in some cases does not have a beam splitter.

Figure 3:
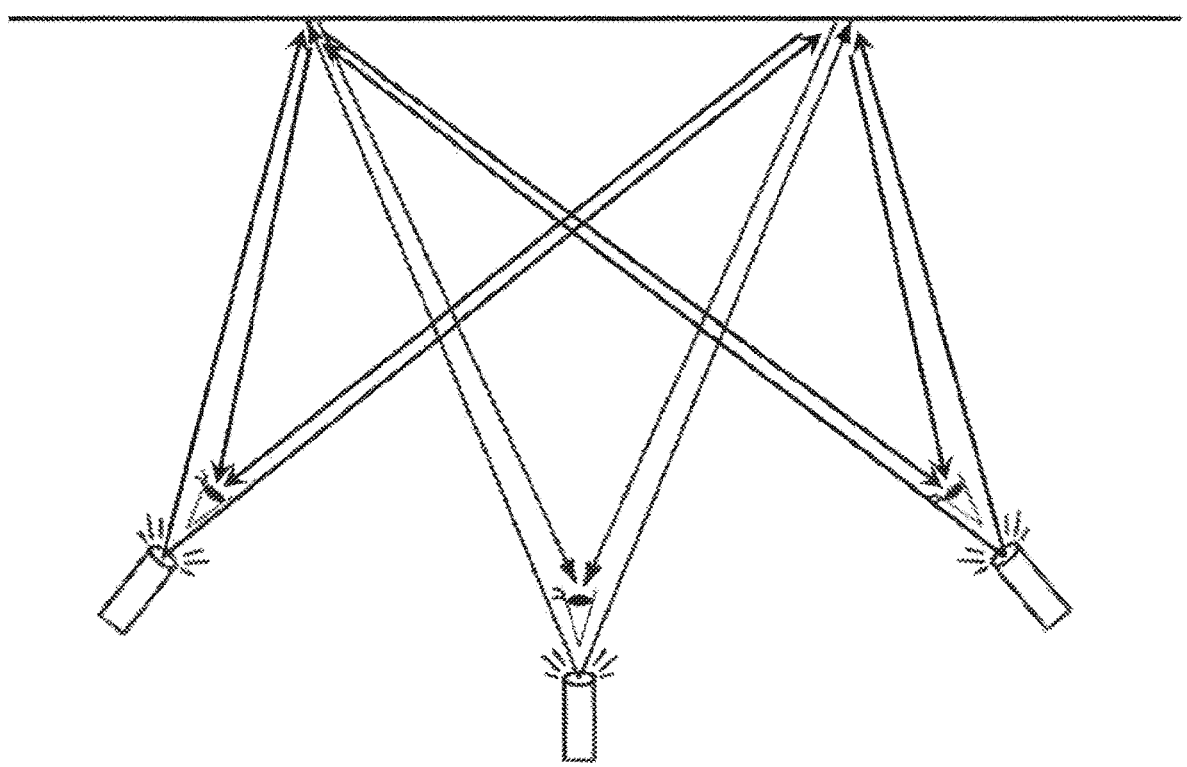
FIG. 3 shows a top view of a schematic showing the capability to have multiple users/eyes viewing independent image or video sources.

FIG. 3 is a top view of a schematic describing the capability to have multiple users/eyes viewing independent image or video sources, in a retro-reflective display system. The retro-reflective screen can be configured to have a highly directional nature such that only eyes in close proximity to a given projector may be able to see the image or video being projected from that projector onto the retro-reflective screen.

Figure 4:
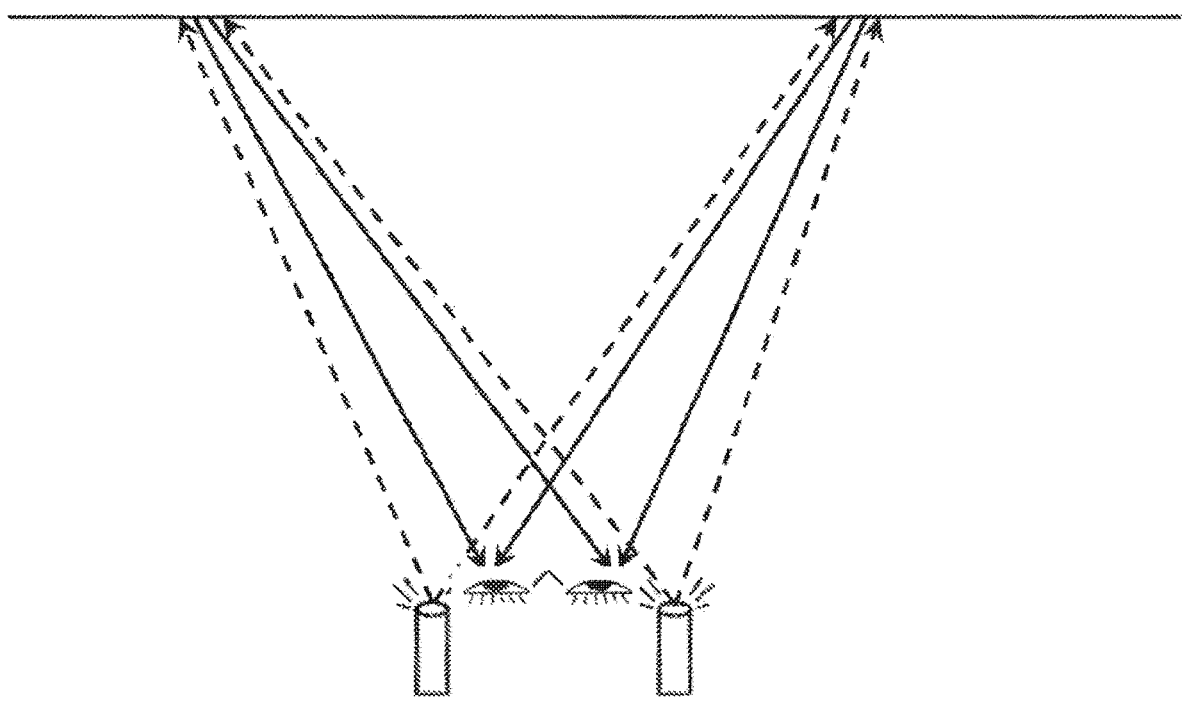
FIG. 4 schematically shows a top view of a representative retro-reflective screen and projector system utilizing two projectors, with one projector in proximity to each eye.

FIG. 4 schematically shows a top view of a representative retro-reflective screen and projector system with the use of two projectors in order to obtain a stereoscopic effect. In this setup, the image projected from the right projector may predominantly be seen by the right eye and similarly for the left projector and left eye. A goal in this type of display setup may be to minimize the brightness of the image from the right projector to the left eye and from the left projector to the right eye (also referred to as "cross-talk"). If cross-talk and perceived cross-talk can be sufficiently minimized, then a glasses free 3D can be enabled.

Figure 5:
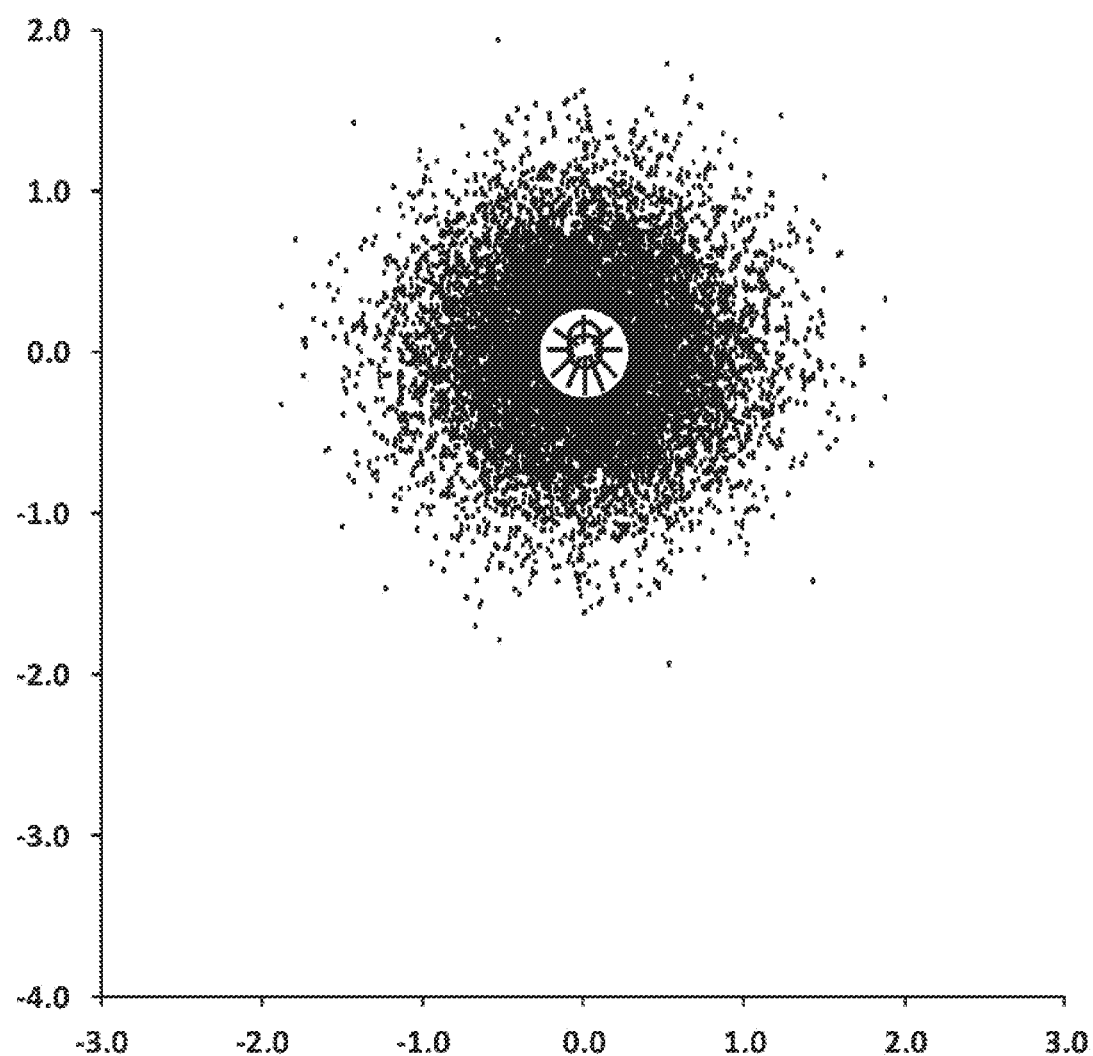
FIG. 5 schematically shows the distribution of retro-reflected light from a representative retroreflective screen.

FIG. 5 shows simulation results for the angular distribution of retro-reflected light from a representative retroreflective screen. The x-axis and y-axis on the chart enumerate the angle in degrees from the source, which in this chart has been placed at 0 degrees in the x-direction and 0 degrees in the y-direction (0, 0). The source has been represented schematically by the graphic drawn at this location. Twelve thousand light rays have been used in the Monte Carlo simulation with each point in the graph representing one light ray. Variation and non-perfect uniformity in the retroreflective screen have been emulated by inducing slight variations in the normal vector for each surface of the three reflective surfaces that comprise a retro-reflective corner cube element. The above description of the methodology used to generate a retro-reflected angular distribution profile applies to the following figures as well, with modifications to source locations and retro-reflective screen uniformity input parameters. In FIG. 5 it can be observed that the bulk of the light rays from the projector reflect back with a small return angle of 0-2 degrees. The distribution of return angles shown in FIG. 5 is representative only and actual return angles may have distribution profiles with a smaller or larger spread of angles depending on the specific properties of each retro-reflective screen.

Figure 6:
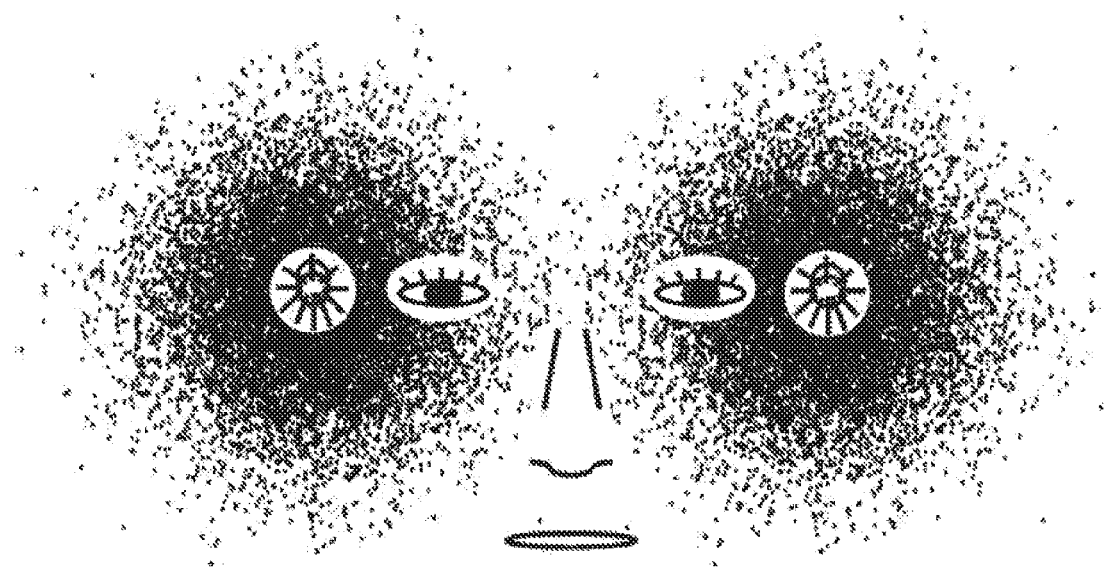
FIG. 6 schematically shows the distribution of retro-reflected light from two projectors sources for a representative retroreflective screen with an overlay of facial positions for a representative viewer at a nominal distance of 2 meters from the screen.

FIG. 6 schematically shows the distribution of retro-reflected light from a representative double projector system for a representative retroreflective screen with an overlay of eye and other facial positions for a representative viewer. In this graph, the viewer may be roughly 5 feet from the screen. The intensity of light from the projector closest to each eye as indicated by the density of dots is much stronger for the near eye than for the far eye. However, the eye further from each respective projector still receives some light, which may result in "cross-talk" and diminish the quality of the stereoscopic effect. In addition, the eye adjacent to each projector is already at an observation angle such that the intensity of light is rapidly diminishing due to the reason that the retro-reflected light profile is centered on the projector.

Figure 7:
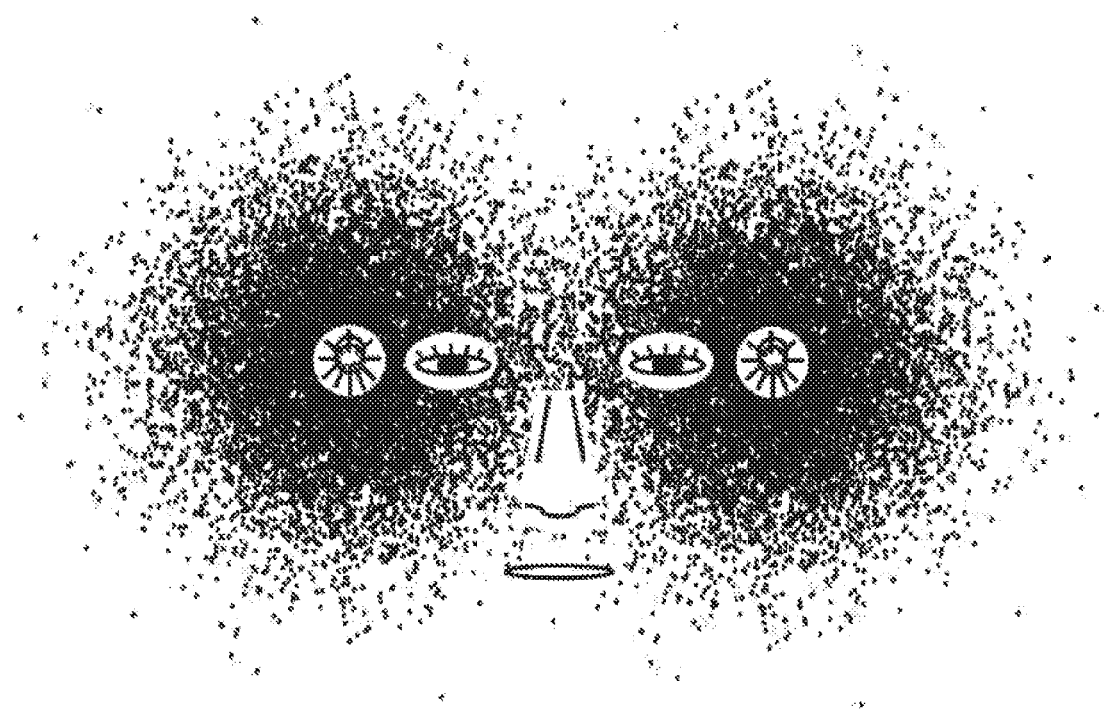
FIG. 7 schematically shows the distribution of retro-reflected light from two projectors sources for a representative retroreflective screen with an overlay of facial positions for a representative viewer at a ~1.5× increased distance of from the screen than in FIG. 7.

FIG. 7 schematically shows the distribution of retro-reflected light from two projectors sources for a representative retroreflective screen with an overlay of facial positions for a representative viewer at a ~1.5× longer distance with respect to the screen than in FIG. 6. At larger distances from the screen, the effective angle between features may be smaller and the overlay of the facial features may be smaller. Similarly, at smaller distances from the screen the effective angle between features may be smaller and the overlay of the facial features may be larger. In this case, the left eye has a smaller effective return angle to the right projector which may result in a larger amount of light crossing over from each projector to the opposite eye which is undesirable for a high quality 3D image. While the intensity of light reaching the left eye from the left projector may also increase because of a similar decrease in that return angle, the relative increase in intensity may be less than the increase in intensity for the light reaching the left eye from the right projector, resulting in an increase in perceived cross-talk.

Figure 8:
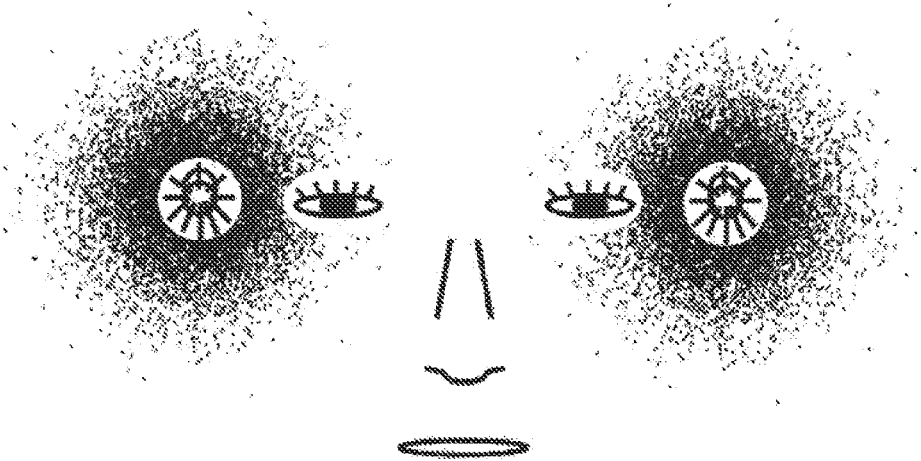
FIG. 8 schematically shows the distribution of retro-reflected light from two projectors sources for a representative retroreflective screen with an overlay of facial positions for a representative viewer at a ~1.5× reduced distance of from the screen than in FIG. 7.

FIG. 8 schematically shows the distribution of retro-reflected light from two projectors sources for a representative retroreflective screen with an overlay of facial positions for a representative viewer at a ~1.5× shorter distance with respect to the screen than in FIG. 6. For a given retro-reflected intensity profile, the closer distance to the screen will result in a smaller profile distribution relative to the facial features and distance between projector and eyes. The undesirable outcome of this is that the intensity of light from each projector (as represented by the density of dots) to the adjacent/near eye is very significantly reduced. This can be observed in this figure by noting that each eye is well outside of the high density region of dots. As a result, perceived cross-talk is still an issue because the ratio of near-eye to far-eye intensity is not increased. In addition, overall image intensity can be significantly impacted.

In actual practice, without aspects of this disclosure what may occur with the current state of art is that if a glasses free 3D viewing experience is desired, there may be a limited range of distances of the viewer to the screen where the 3D image is most optimal. If the viewer is too close to the screen, then overall image intensity may be reduced due to return angles being too large. If the viewer is too far from the screen, then cross-talk from the opposite projector to each eye may become a significant problem and result in ghosting or double images.

A simple tightening of the angular distribution of retro-reflected light from a retroreflective screen does not necessarily reduce cross-talk. Simulation results show that while the absolute amount of cross-talk light from each projector the opposite eye is reduced, the intensity of light reaching the eye closest to each projector is also significantly reduced as the viewer to screen distance is reduced, so the cross-talk ratio is not significantly improved.

Retro-reflective screen elements and angular distribution of light from the elements may be as described, for example, in U.S. Pat. Nos. 3,817,596, 4,775,219 and 7,370,981, and P. R. Yoder, "Study of Light Deviation Errors in Triple Mirrors and Tetrahedral Prisms," J. Optical Soc. Amer., vol. 48, No. 7, pp 496-499 (July 1958), each of which is entirely incorporated herein by reference.

Figure 9:
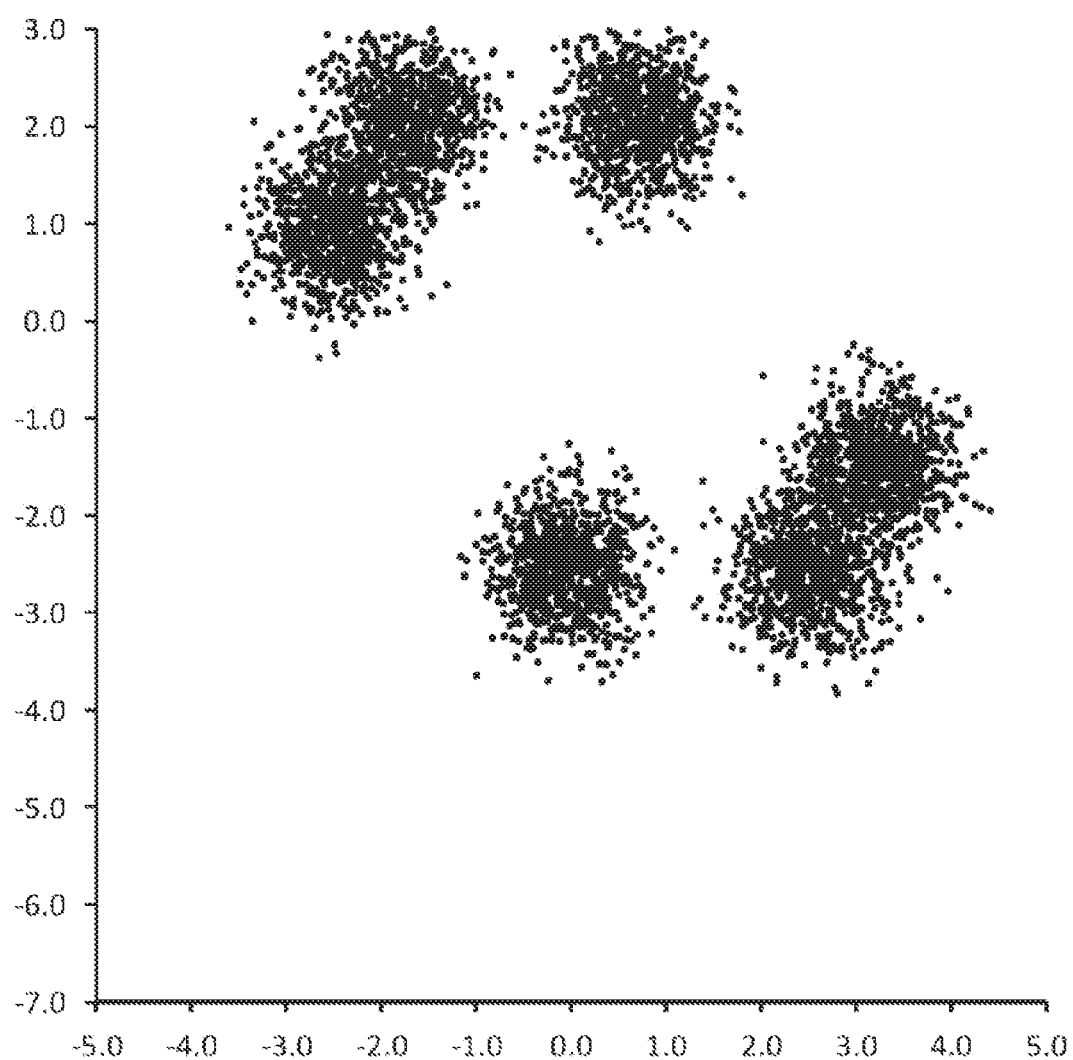
FIG. 9 schematically shows a representative retro-reflected distribution profile that can occur when attempting to engineer a non-zero return angle when the corner cube mirror elements are not engineered to optimize all 6 potential reflection combinations.

FIG. 9 schematically shows what can occur when attempting to engineer a non-zero desired return angle when the corner cube mirror elements are not engineered to optimize all 6 potential reflection combinations. In this case, while one of the 6 possible combinations of reflection sequences has been optimized for hypothetical return angles of roughly 0 degrees in the x-direction and roughly −2.5 degrees in the y-direction the other 5 reflection sequences result in return angles that differ from this hypothetical desired return angle. Even though the faces of the corner cube element in this case and in the following cases are not perfectly perpendicular, these elements are still regarded as corner-cube retro-reflective screen elements because of the close similarity in form and function to an ideal corner-cube element.

In order to attain an optimal light profile to be optimal for retro-reflective display applications, the present disclosure provides for customizing of retro reflective screen elements of retro reflective screens such that return angles are combined in order to meet the desired properties for each specific display application.

Figure 10:
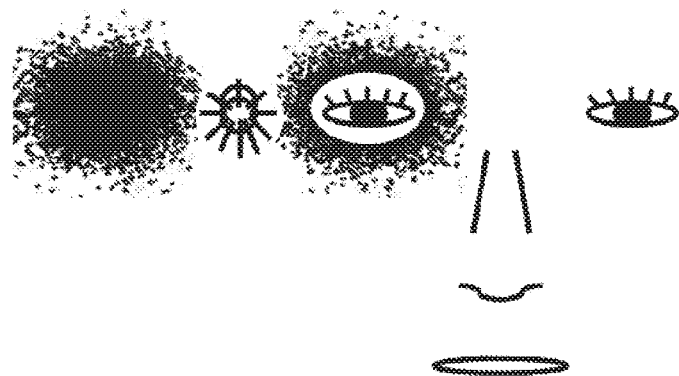
FIG. 10 shows the distribution of retro-reflected light from a single projector source for a representative retroreflective screen engineered to have horizontally offset focal points toward the left and right directions. Also in the figure is an overlay of eye positions for a representative viewer at a representative distance of approximately 6 feet from the screen.

FIG. 10 shows the distribution of retro-reflected light from a single projector source for a representative retroreflective screen engineered to have horizontally offset focal points toward the left and right directions. As seen in FIG. 10, the projector is positioned to the right side of the face of the user. Also in the figure is an overlay of eye positions for a representative viewer at a representative distance of approximately 6 feet from the screen. In this configuration it is important to have a tight profile distribution towards the left and right edges in order to minimize cross-talk. Additionally, as seen in FIG. 10, the resultant profile has been stretched horizontally. In this way, the shape of the profile is similar to that of an oval, while a shape of a non-stretched profile may be similar to a circle.

Figure 11:
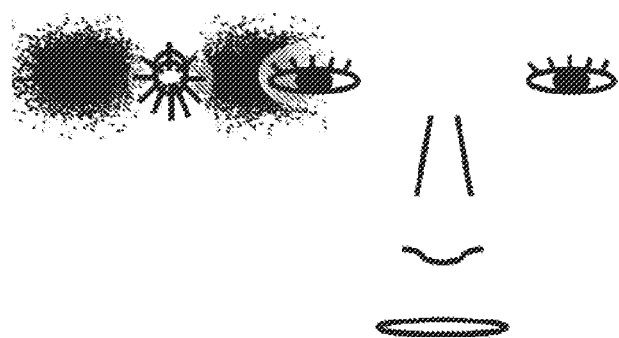
FIG. 11 shows the distribution of retro-reflected light from a single projector source for a representative retroreflective screen engineered to have horizontally offset focal points toward the left and right directions. Also in the figure is an overlay of eye positions for a representative viewer at a closer distance to the screen versus the scenario shown in FIG. 10.

FIG. 11 shows the distribution of retro-reflected light from a single projector source for a representative retroreflective screen engineered to have horizontally offset focal points toward the left and right directions. Also in the figure is an overlay of eye positions for a representative viewer at a closer distance to the screen versus the scenario shown in FIG. 10. With the horizontally stretched retro-reflected profile, the eye that is nearest to each projector remains in the high intensity region of the retro-reflected profile. Additionally, as the shape of the profile is still stretched, the shape of the profile is similar to that of an oval, while a shape of a non-stretched profile may be similar to a circle.

Figure 12:
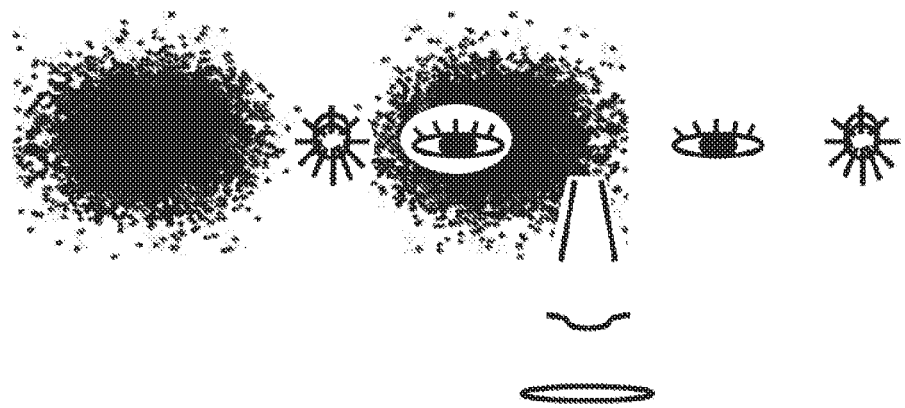
FIG. 12 shows the distribution of retro-reflected light from a single projector source for a representative retroreflective screen engineered to have horizontally offset focal points toward the left and right directions. Also in the figure is an overlay of eye positions for a representative viewer at a further distance to the screen versus the scenario shown in FIG. 10.
Figure 13:
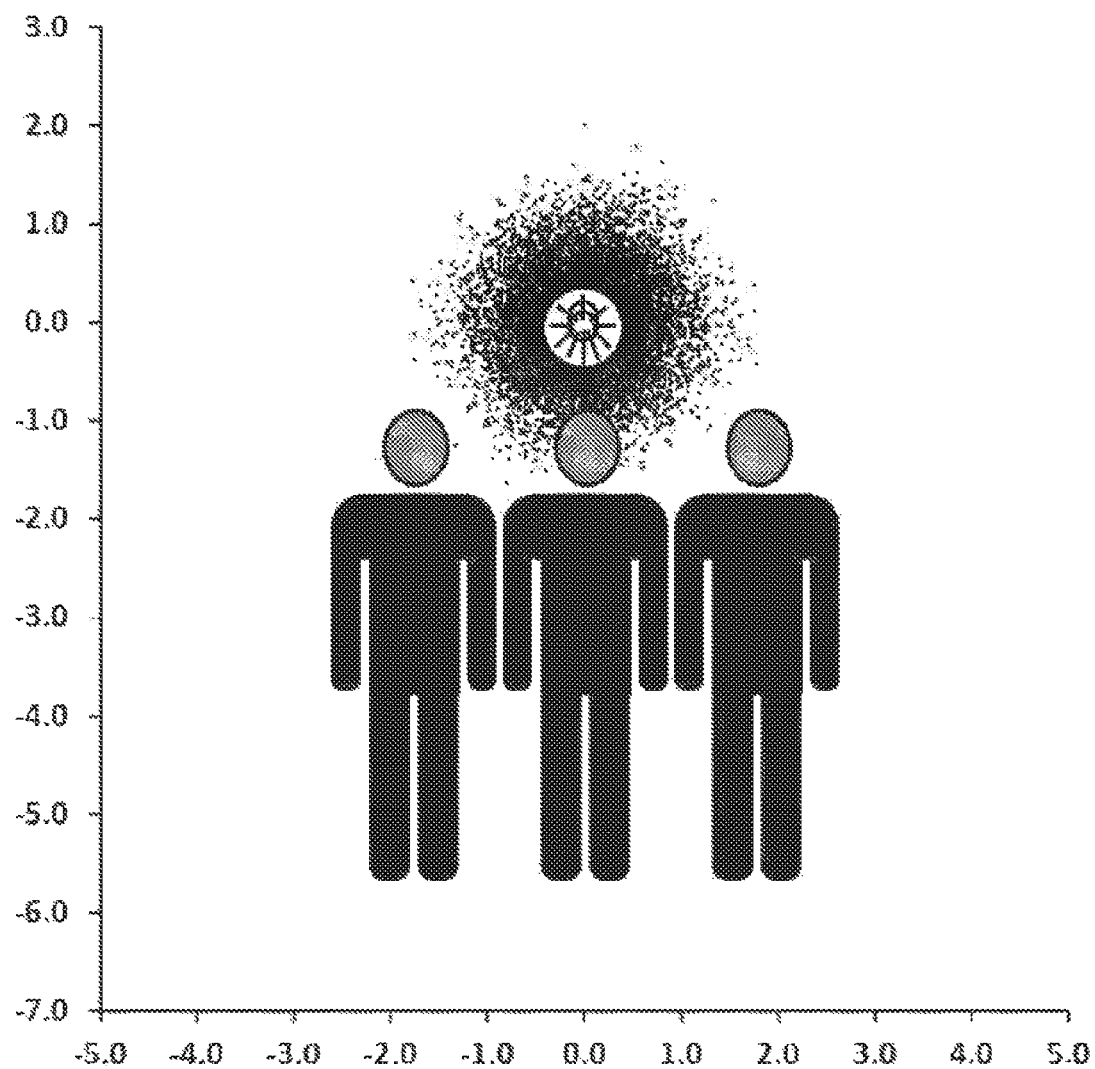
FIG. 13 schematically illustrates a retro-reflective display application in which viewers are at a significant distance (>>200 cm) from the screen and a projector may be in proximity to each of the viewers, but not head-mounted, resulting in a projector to eye distance greater than that shown in previous figures.
Figure 14:
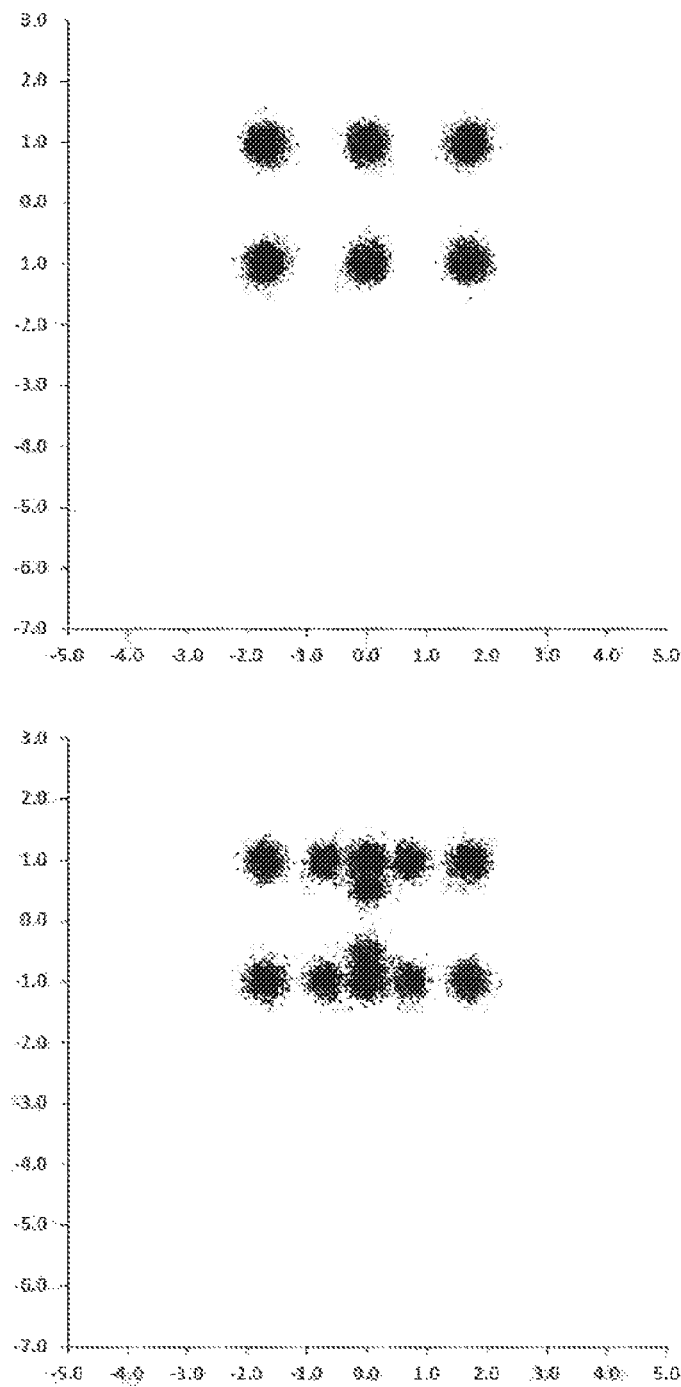
FIG. 14 shows two examples of simulation results for the angular distribution of retro-reflected light from a single projector sources for a representative retroreflective screen engineered to have multiple retro-reflected angles such that the returned light occupies a horizontal band of light. In this figure the variation parameter has been tightened to enable better visualization of the individual return angle center points.

FIG. 12 shows the distribution of retro-reflected light from a single projector source for a representative retroreflective screen engineered to have horizontally offset focal points toward the left and right directions. Also in the figure is an overlay of eye positions for a representative viewer at a further distance to the screen versus the scenario shown in FIG. 10. In this figure it becomes more readily apparent why a sharply defined profile with a sharp intensity fall-off at the left/right edges is important. In particular, a sharply defined profile with a sharp intensity fall-off may be used to ensure that each eye of a user views projected images that are tailored to that particular eye. At these far distances, the near eye remains within the high intensity region of the retro-reflected profile, however, the other edge of the profile become near to the far eye. A profile with a sharply defined intensity drop-off is therefore required in order to minimize cross-talk;

FIG. 13 schematically illustrates a retro-reflective display application in which viewers are at a significant distance (>>200 cm) from the screen and a projector may be in proximity to one of the viewers, but not head-mounted, resulting in a projector to eye distance greater than that shown in previous figures. In this figure we see that unless the projector is in very close proximity to the viewers, only the nearest view will observe any reasonable intensity of light and even for the nearest observer, the intensity of light is significantly diminished. Additionally, the intensity of light will be very sensitive to slight movements on the part of the nearest viewer which is an undesirable effect;

FIG. 14 shows two examples of simulation results for the angular distribution of retro-reflected light from a single projector sources for a representative retroreflective screen engineered to have multiple retro-reflected angles such that the returned light occupies a horizontal band of light. In this figure the variation parameter has been tightened to enable better visualization of the individual return angle center points. Referring to FIG. 14, two specific examples are shown. In representative scenario illustrated in the top graph, six (6) specific return angles are targeted to spread from approximately −2 degrees to +2 degrees in the x-direction and approximately −1 degrees in the y-direction. The uniformity of the retro-reflected distribution is tightened in this simulation in order to better illustrate the 6 individually targeted return angles. In representative scenario shown in the bottom graph, the return angles are targeted to spread from approximately −2 degrees to +2 degrees in the x-direction and approximately −1 degrees in the y-direction.

Figure 15:
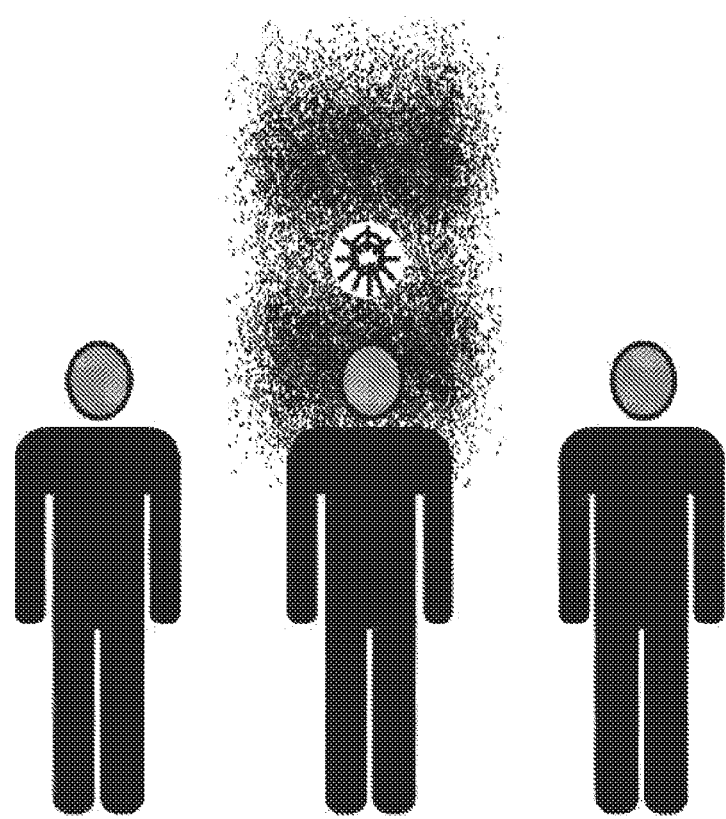
FIG. 15 shows a representative angular distribution of retro-reflected light from a single projector source for a representative retroreflective screen engineered to have multiple retro-reflected angles such that the returned light occupies a horizontal band of light with a characteristic width and height corresponding to the desired angles for the specific application. An overlay of multiple viewers is shown in this chart.

FIG. 15 shows a representative angular distribution of retro-reflected light from a single projector source for a representative retroreflective screen engineered to have multiple retro-reflected angles such that the returned light occupies a horizontal band of light with a characteristic width and height corresponding to the desired angles for the specific application. An overlay of multiple viewers is shown in this chart. In this example, the profile has been engineered to have a uniform intensity profile optimized for a single user, but with a sharp intensity fall-off outside of the region of viewing for that single user. In particular, the retroreflective profile provides multiple positions where a user may view a tailored projected image while also maintaining separation between projected images for nearby viewers. This provides for a good viewing experience for that single user (e.g., the user in the middle in FIG. 15), while also providing privacy of viewing by minimizing light reaching adjacent viewers (e.g., user to the left and right of the user in the middle).

Figure 16:
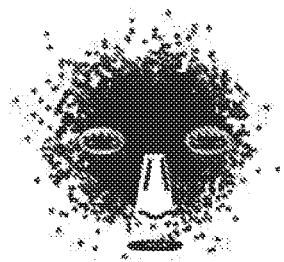
FIG. 16 shows two representative angular distributions of retro-reflected light for the scenario in which it is desired to have a large angular separation from the projector(s) to the viewer. Single projector (left) and double projector (right) scenarios are shown.
Figure 16:
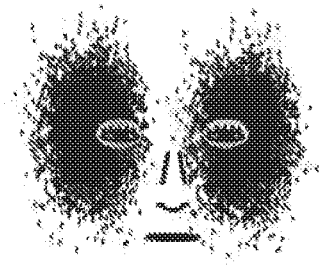
Figure 16:
Figure 16:
Figure 16:
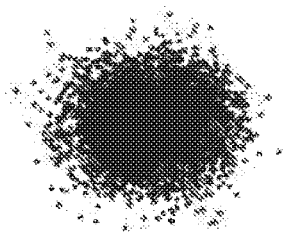
Figure 16:
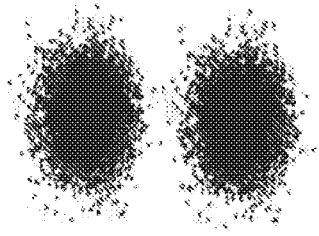

FIG. 16 shows two representative angular distribution of retro-reflected light for the scenario in which it is desired to have a large angular separation from the projector(s) to the viewer. Single projector (left) and double projector (right) scenarios are shown. In the left side of the figure a single projector is used with a large vertical separation for the retro-reflected profile. This is useful in scenarios such as office based retro-reflective screens to replace monitors or public transportation environments such as airplanes and trains wherein retroreflective screens may be in close proximity to the user, but there is a desire to have a non-head-mounted projector. Other applications of this configuration include home consumer digital displays and out-of-home retail settings. The right side of the figure depicts a setup in which dual projectors are used in order to retain stereoscopic capabilities. In this case, a narrow retroreflective profile is required in order to minimize cross-talk. In this context, the desired "narrowness" of the profile can be determined by simple geometric calculation. For example, if a profile width of 5 cm is desired in a scenario wherein the user is −250 cm from the display screen, then the desired profile width in angles would be less than 1.15 degrees.

Figure 17:
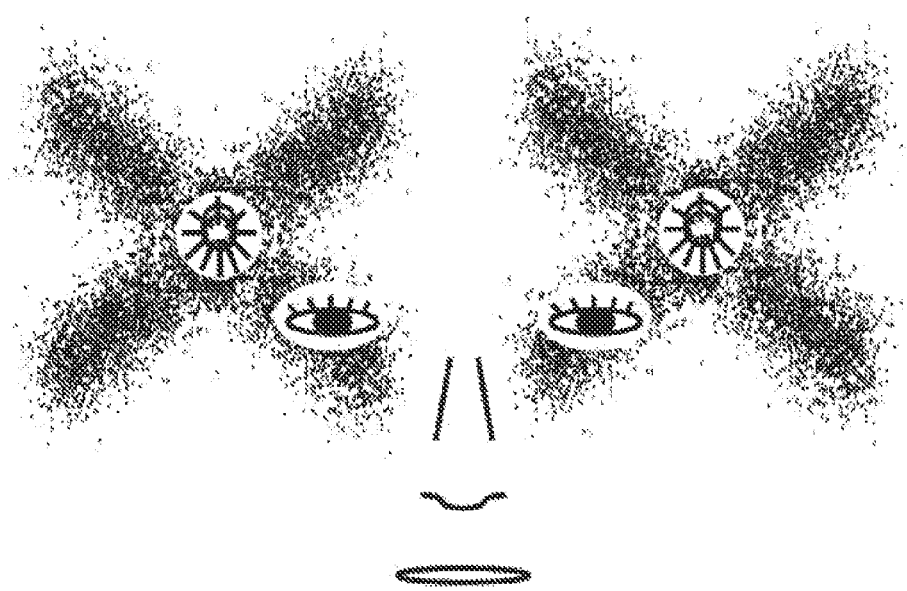
FIG. 17 shows a representative angular distributions of retro-reflected light for a scenario in which it projector(s) are mounted to the side and above the eyes.

FIG. 17 shows a representative angular distribution of retro-reflected light for a scenario in which projector(s) are mounted to the side and above the eyes. Yet another configuration that may be used for retro-reflective display applications are to mount the projectors to the side of the head but offset above or below the eyes. In this case, it may be beneficial to have an "x" like retro-reflected distribution as shown in this figure.

Figure 18:
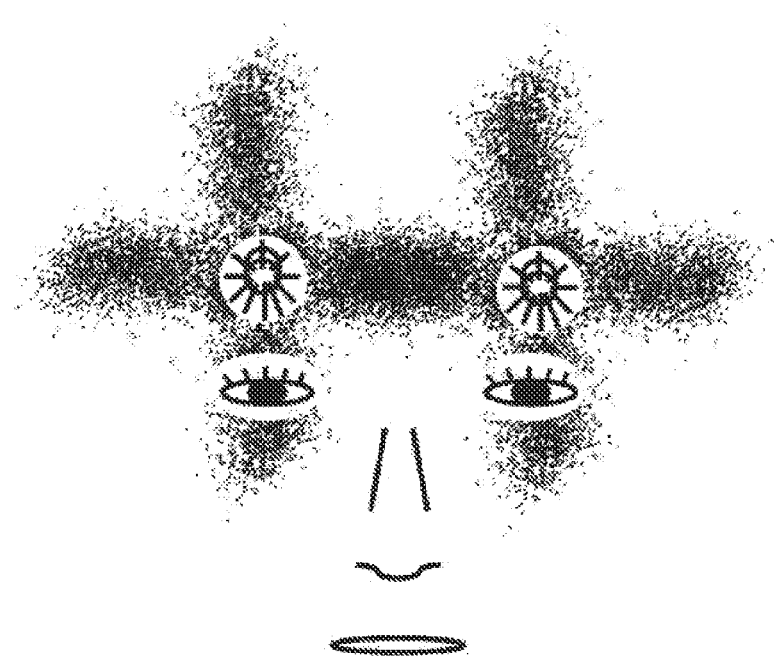
FIG. 18 shows a representative angular distributions of retro-reflected light for a scenario in which it projector(s) are mounted above the eyes for cases wherein viewers may be facing the screen at 90 degree rotations, such as around a square or rectangular tabletop screen.

FIG. 18 shows a representative angular distribution of retro-reflected light for a scenario in which projector(s) are mounted above the eyes for cases wherein viewers may be facing the screen at 90 degree rotations, such as around a square or rectangular tabletop screen. One of the challenges with retro-reflective display systems wherein the retro-reflective screen is placed flat on a surface such as a table top or desk is that it is difficult to predict the location of the viewer(s). Engineering of screen elements to induce an offset that may increase intensity for one view may significantly decrease intensity for one or more other views. With the "+" shaped retro-reflective distribution profile shown in this figure, a high intensity retro-reflective profile can be achieved at 4 different orientations around a table. For example, around a square table, each of the primary 4 locations may be suitable locations for viewing content using the retro-reflective screen.

Figure 19:
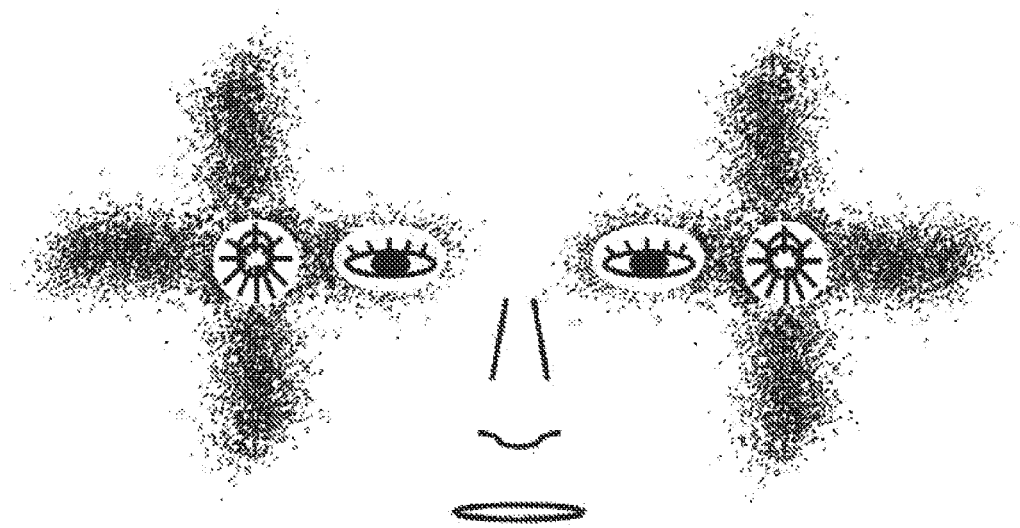
FIG. 19 shows a representative angular distributions of retro-reflected light for a scenario in which it projector(s) are mounted to the side of the eyes for cases wherein viewers may be facing the screen at 90 degree rotations, such as around a square or rectangular tabletop screen.

FIG. 19 shows a representative angular distribution of retro-reflected light for a scenario in which projector(s) are mounted to the side of the eyes for cases wherein viewers may be facing the screen at 90 degree rotations, such as around a square or rectangular tabletop screen. One of the challenges with retro-reflective display systems wherein the retro-reflective screen is placed flat on a surface such as a table top or desk is that it is difficult to predict the location of the viewer(s). Engineering of screen elements to induce an offset that may increase intensity for one view may significantly decrease intensity. With the "+" shaped retro-reflective distribution profile shown in this figure, a high intensity retro-reflective profile can be achieved at 4 different orientations around a table. For example, around a square table, each of the primary 4 locations (e.g., 3 o'clock, 6 o'clock, 9 o'clock, and 12 o'clock direction around the focal point of the distribution profile) may be suitable locations for viewing content using the retro-reflective screen.

Figure 20:
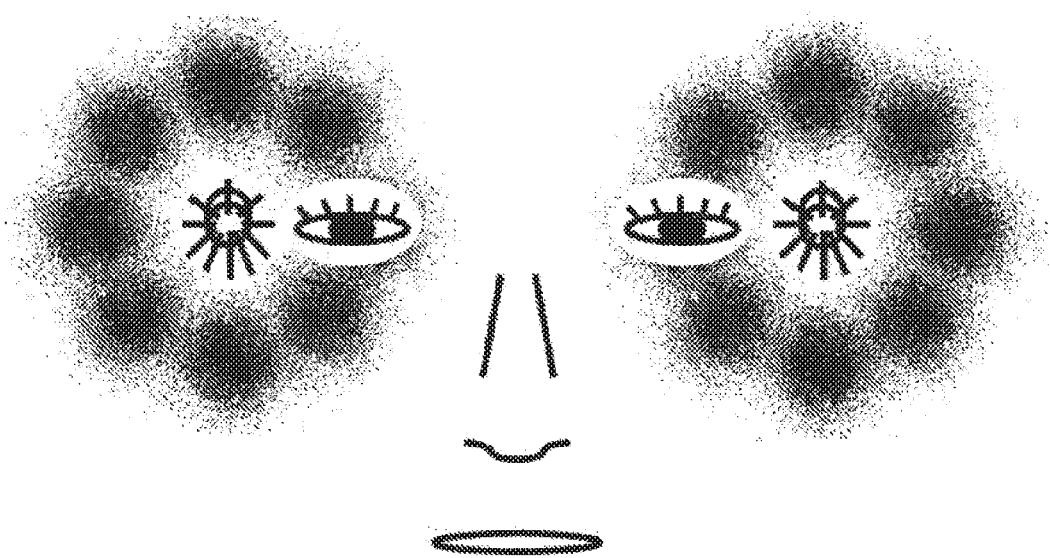
FIG. 20 shows a representative angular distributions of retro-reflected light for a scenario in which it projector(s) are mounted to the side of the eyes for cases wherein viewers may be facing the screen a variety of locations relative to the screen, such as may occur with usage of a tabletop screen.

FIG. 20 shows a representative angular distribution of retro-reflected light for a scenario in which projector(s) are mounted to the side of the eyes for cases wherein viewers may be facing the screen a variety of locations relative to the screen, such as may occur with usage of a tabletop screen. With the more radially symmetric profile shown in this figure, users may be able to move around the flat screen with less impact to viewing intensity and cross-talk. In the embodiment provided in FIG. 20, a table top may have up to eight distinct viewing areas where a user may be oriented so as to view a projected image.

There are various approaches for manufacturing retro-reflective screens with retro-reflective screen elements. Examples of such approaches are described in U.S. Pat. Nos. 5,763,049 and 7,261,424, each of which is entirely incorporated herein by reference.

Computer Systems

Another aspect of the present disclosure provides a system that is programmed or otherwise configured to implement the methods of the disclosure. The system can include a computer server that is operatively coupled to a projector and a photo detector. The projector and photo detector can be standalone units, or integrated as a projection and detection system.

Figure 21:
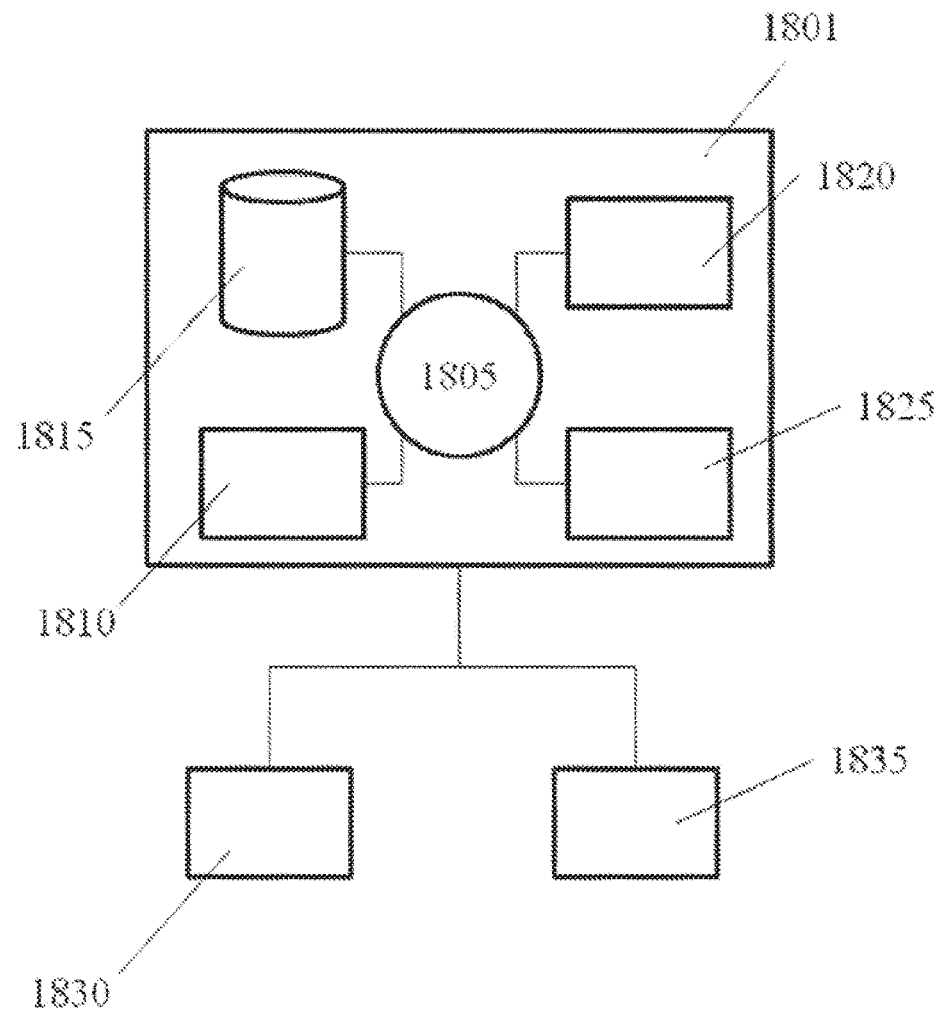
FIG. 21 schematically illustrates a computer system programmed or otherwise configured to facilitate methods of the present disclosure.

FIG. 21 shows a system 1800 comprising a computer server ("server") 1801 that is programmed to implement methods disclosed herein. The server 1801 includes a central processing unit (CPU, also "processor" and "computer processor" herein) 1805, which can be a single core or multi core processor, or a plurality of processors for parallel processing. The server 1801 also includes memory 1810 (e.g., random-access memory, read-only memory, flash memory), electronic storage unit 1815 (e.g., hard disk), communication interface 1820 (e.g., network adapter) for communicating with one or more other systems, and peripheral devices 1825, such as cache, other memory, data storage and/or electronic display adapters. The memory 1810, storage unit 1815, interface 1820 and peripheral devices 1825 are in communication with the CPU 1805 through a communication bus (solid lines), such as a motherboard. The storage unit 1815 can be a data storage unit (or data repository) for storing data. The server 1801 can be operatively coupled to a computer network ("network") with the aid of the communication interface 1820. The network can be the Internet, an internet and/or extranet, or an intranet and/or extranet that is in communication with the Internet. The network in some cases is a telecommunication and/or data network. The network can include one or more computer servers, which can enable distributed computing, such as cloud computing. The network, in some cases with the aid of the server 1801, can implement a peer-to-peer network, which may enable devices coupled to the server 1801 to behave as a client or a server.

The storage unit 1815 can store files or data. The server 1801 can include one or more additional data storage units that are external to the server 1801, such as located on a remote server that is in communication with the server 1801 through an intranet or the Internet.

In some situations, the system 1800 includes a single server 1801. In other situations, the system 1800 includes multiple servers in communication with one another through an intranet and/or the Internet.

The server 1801 can be adapted to store user information and data of or related to a projection environment, such as, for example, display angles and intensity settings. The server 1801 can be programmed to display an image or video through a projector coupled to the server 1801.

Methods as described herein can be implemented by way of machine (or computer processor) executable code (or software) stored on an electronic storage location of the server 1801, such as, for example, on the memory 1810 or electronic storage unit 1815. During use, the code can be executed by the processor 1805. In some cases, the code can be retrieved from the storage unit 1815 and stored on the memory 1810 for ready access by the processor 1805. In some situations, the electronic storage unit 1815 can be precluded, and machine-executable instructions are stored on memory 1810.

The code can be pre-compiled and configured for use with a machine have a processer adapted to execute the code, or can be compiled during runtime. The code can be supplied in a programming language that can be selected to enable the code to execute in a pre-compiled or as-compiled fashion.

The server 1801 is coupled to (e.g., in communication with) a projector 1830 and a photo detector 1835. In an example, the projector 1830 can project an image or video onto a retro-reflective screen. In another example, the projector 1830 can project ultraviolet or infrared light onto the retro-reflective screen. The photo detector 1835 can detect (or measure) reflected light from the retro-reflective screen.

The projector 1830 can include one or more optics for directing and/or focusing an image or video onto the retro-reflective screen. The photo detector can be a device that is configured to generate an electrical current upon exposure to light, such as, for example, a charge-coupled device (CCD).

Aspects of the systems and methods provided herein, such as the server 1801, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that can-y such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables, copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM; a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

Methods and systems of the present disclosure can be implemented by way of one or more algorithms. An algorithm can be implemented by way of software upon execution by the central processing unit 1805. The algorithm can, for example, determine optimum offsets for retro-reflective screen elements.

Systems and methods provided herein may be combined with or modified by other systems and methods, such as those described in, for example, U.S. Patent Publication No. 2013/0342813; U.S. Pat. Nos. 3,817,596, 4,775,219, 5,763, 049, 7,261,424, and 7,370,981; and P. R. Yoder, "Study of Light Deviation Errors in Triple Mirrors and Tetrahedral Prisms," J. Optical Soc. Amer., vol. 48, No. 7, pp 496-499 (July 1958), each of which is entirely incorporated herein by reference, each of which is entirely incorporated herein by reference.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A projection display, comprising:
  a retro-reflective display screen comprising a plurality of retro-reflective elements including some that are arranged differently from each other to have different return angles, formed between a path of an incident light beam from a projector and paths of reflected light beams returned by the retro-reflective elements, such that the retro-reflective display screen is configured to display an image to a viewer at a viewing distance from a major surface of the retro-reflective display screen, wherein the different return angles are such that an area in a vertical plane at the viewing distance that is crossed by the reflected light beams to form the image is elongated in a vertical direction normal to a ground or to a horizontal direction parallel to the ground.

2. The projector display of claim 1, wherein each of the retro-reflective elements comprises three intersection angles formed by three intersecting planes, wherein the differently arranged retro-reflective elements have at least one of the three intersection angles that deviate from 90 degrees by 0.1-10 degrees.

3. The projector display of claim 2, wherein the differently arranged retro-reflective elements have each the three intersection angles that deviate from 90 degrees by 0.1-10 degrees.

4. The projection display of claim 1, wherein the different return angles form a plurality of light distribution regions within the area each having a focal point that is offset in the vertical direction by a distance corresponding to an angle, formed between a horizontal reference plane parallel to the ground and crossing the projector and a path of a reflected light beam passing through the focal point, that is greater than 1 degree.

5. The projection display of claim 4, wherein the light distribution regions comprise two light distribution regions having focal points that are disposed on opposite sides of the horizontal reference plane in the vertical direction.

6. The projection display of claim 1, wherein the retro-reflective display is configured to have an observation angle, formed between the path of the incident light beam to a location on the retro-reflective screen and a path from the location to the viewer, that is less than 10 degrees, wherein outside of the observation angle, an intensity of the reflected light beans drops off by 50% or more per an increase of 0.5 degrees.

7. The projector display of claim 1, wherein the retro-reflective display has one or both of a width or a length that exceeds 1 meter.

8. The projection display of claim 1, wherein the retro-reflective display is configured to display the image in the area large enough to cover both eyes of the user using a single projector at the viewing distance that is greater than 2 meters.

9. A projection display system, comprising the projection display of claim 1, and further comprising the projector configured to generate the incident light beam carrying a signal of the image.

10. A projection display, comprising:
a retro-reflective display screen comprising a plurality of retro-reflective elements including some that are arranged differently from each other to have different return angles, formed between a path of an incident light beam from a projector and paths of reflected light beams returned by the retro-reflective elements, such that the retro-reflective display screen is configured to display an image to a viewer at a viewing distance from a major surface of the retro-reflective display screen, wherein the different return angles are such that an area in a vertical plane at the viewing distance that is crossed by the reflected light beams to form the image comprises a plurality of light distribution regions that collectively form a band of light that extends in a vertical direction normal to a ground.

11. The projection display of claim 10, wherein the area has a height in the vertical direction that is greater than a width in a horizontal direction by a factor of about two or greater.

12. The projection display of claim 10, wherein the plurality of light distribution regions formed within the area each has a focal point that is offset in a vertical direction by a distance corresponding to an angle, formed between a horizontal reference plane parallel to the ground and crossing the projector and a path of a reflected light beam passing through the focal point, that is greater than 1 degree.

13. The projection display of claim 12, wherein the light distribution regions comprise two light distribution regions having focal points that are disposed on opposite sides of the horizontal reference plane in the vertical direction.

14. The projection display of claim 13, wherein the two light distributions do not overlap.

15. The projector display of claim 10, wherein each of the retro-reflective elements comprises three intersection angles formed by three intersecting planes, wherein the differently arranged retro-reflective elements have at least one of the three intersection angles that deviate from 90 degrees by 0.1-10 degrees.

16. The projection display of claim 10, wherein the retro-reflective display is configured to display the image in the area large enough to cover both eyes of the user using a single projector at the viewing distance that is greater than 2 meters.

17. A projection display, comprising:
a retro-reflective display screen comprising a plurality of retro-reflective elements including some that are arranged differently from each other to have different return angles, formed between by a path of an incident light beam from a projector and paths of reflected light beams returned by the retro-reflective elements, such that the retro-reflective display screen is configured to display an image to a viewer at a viewing distance from a major surface of the retro-reflective display screen, wherein the different return angles are such that an area in a vertical plane at the viewing distance that is crossed by the reflected light beams to form the image forms a band of light that extends in a vertical direction normal to a ground, and
wherein the band of light is sufficiently narrow in a horizontal direction such that the image is substantially not visible from positions in the vertical plane that are laterally adjacent to the viewer corresponding to return angles greater than about +1 degree and less than about −1 degree with respect to the incident light beam.

18. The projection display of claim 17, wherein the retro-reflective display has an observation angle, formed between the path of the incident light beam to a location on the retro-reflective screen and a path from the location to the viewer, that is less than 10 degrees, and wherein outside of the observation angle, an intensity of the reflected light beams drops off by 50% or more per an increase of 0.5 degrees.

19. The projector display of claim 17, wherein each of the retro-reflective elements comprises three intersection angles formed by three intersecting planes, wherein the differently arranged retro-reflective elements have at least one of the three intersection angles that deviate from 90 degrees by 0.1-10 degrees.

20. The projector display of claim 17, wherein the different return angles are such that an area in a vertical plane at the viewing distance that is crossed by the reflected light beams to form the image comprises a plurality of light distribution regions within the area each having a focal point that is offset in a vertical direction by a distance corresponding to an angle, formed between a horizontal reference plane parallel to the ground and crossing the projector and a path of a reflected light beam passing through the focal point, that is greater than 1 degree.

21. The projection display of claim 17, wherein the retro-reflective display is configured to display the image in the area large enough to cover both eyes of the user using a single projector at the viewing distance that is greater than 2 meters.

* * * * *

UNITED STATES PATENT AND TRADEMARK OFFICE
CERTIFICATE OF CORRECTION

PATENT NO. : 11,143,946 B2  
APPLICATION NO. : 16/829924  
DATED : October 12, 2021  
INVENTOR(S) : Michael W. Wang Page 1 of 2

It is certified that error appears in the above-identified patent and that said Letters Patent is hereby corrected as shown below:

In the Specification

In Column 3, Line 6, delete "00." and insert --0°.--.

In Column 3, Line 9, delete "00°." and insert --0°.--.

In Column 3, Line 18, delete "00." and insert --0°.--.

In Column 4, Line 15, delete "00." and insert --0°.--.

In Column 4, Line 18, delete "00°." and insert --0°.--.

In Column 4, Line 26, delete "00°." and insert --0°.--.

In Column 4, Line 40, delete "comprise s" and insert --comprises--.

In Column 4, Line 62, delete "00." and insert --0°.--.

In Column 5, Line 6, delete "00." and insert --0°.--.

In Column 5, Line 8, delete "00°." and insert --0°.--.

In Column 5, Line 12, delete "comprise s" and insert --comprises--.

In Column 5, Line 38, delete "00°." and insert --0°.--.

In Column 6, Line 47, delete "generate" and insert --(i) generate--.

In Column 8, Line 50, delete "screen." and insert --screen;--.

Signed and Sealed this  
Twenty-second Day of March, 2022

Drew Hirshfeld  
*Performing the Functions and Duties of the*  
*Under Secretary of Commerce for Intellectual Property and*  
*Director of the United States Patent and Trademark Office*

CERTIFICATE OF CORRECTION (continued)
U.S. Pat. No. 11,143,946 B2

In Column 10, Line 55, delete "3° display" and insert --3°. The display--.

In Column 11, Line 58, delete "case s," and insert --cases,--.

In Column 11, Line 63, delete "00." and insert --0°.--.

In Column 11, Line 64, delete "0.10," and insert --0.1°,--.

In Column 12, Line 53, delete "00" and insert --0°--.

In Column 12, Line 57, delete "00." and insert --0°.--.

In Column 12, Line 62, delete "00." and insert --0°.--.

In Column 13, Line 17, delete "Cat" and insert --C at--.

In Column 13, Line 66, delete "they" and insert --the y--.

In Column 16, Line 22, delete "cross-talk;" and insert --cross-talk.--.

In Column 16, Line 34, delete "effect;" and insert --effect.--.

In Column 19, Line 16, delete "processer" and insert --processor--.

In Column 19, Line 57, delete "can-y" and insert --carry--.

In Column 20, Line 17, delete "RAM;" and insert --RAM,--.

In the Claims

In Column 21, Line 20, Claim 3, delete "each the" and insert --each of the--.

In Column 21, Line 41, Claim 6, delete "beans" and insert --beams--.